United States Patent [19]
Carroll et al.

[11] Patent Number: 6,057,966
[45] Date of Patent: May 2, 2000

[54] BODY-CARRYABLE DISPLAY DEVICES AND SYSTEMS USING E.G. COHERENT FIBER OPTIC CONDUIT

[75] Inventors: David W. Carroll, Northfield, Minn.; Tad D. Shelfer, Houston, Tex.; Phillip D. Anz-Meador, Houston, Tex.; T. Diana Anz-Meador, Houston, Tex.

[73] Assignee: ViA, Inc., Northfield, Minn.

[21] Appl. No.: 08/853,730

[22] Filed: May 9, 1997

[51] Int. Cl.⁷ .............................. G02B 27/14; G09G 5/00
[52] U.S. Cl. ................................................ 359/630; 345/8
[58] Field of Search ................................. 359/630, 631, 359/633; 345/8

[56] References Cited

U.S. PATENT DOCUMENTS

| | | | |
|---|---|---|---|
| 3,923,370 | 12/1975 | Mostrom | 359/630 |
| 4,348,185 | 9/1982 | Breglia et al. | 434/43 |
| 4,361,384 | 11/1982 | Bosserman | 359/630 |
| 4,636,866 | 1/1987 | Hattori | 358/236 |
| 4,743,200 | 5/1988 | Welch et al. | 434/43 |
| 5,003,300 | 3/1991 | Wells | 340/705 |
| 5,033,300 | 7/1991 | Matsuo et al. | 73/304 |
| 5,091,719 | 2/1992 | Beamon, III | 340/705 |
| 5,166,778 | 11/1992 | Beamon, III | 358/3 |
| 5,189,512 | 2/1993 | Cameron et al. | 358/93 |
| 5,208,449 | 5/1993 | Eastman et al. | 235/462 |
| 5,281,957 | 1/1994 | Schoolman | 348/8 |
| 5,285,398 | 2/1994 | Janik | 364/708.1 |
| 5,321,416 | 6/1994 | Bassett et al. | 345/8 |
| 5,322,441 | 6/1994 | Lewis et al. | 434/307 |
| 5,325,386 | 6/1994 | Jewell et al. | 372/50 |
| 5,348,477 | 9/1994 | Welch et al. | 434/43 |
| 5,392,158 | 2/1995 | Tosaki | 359/633 |
| 5,414,544 | 5/1995 | Aoyagi et al. | 359/53 |
| 5,416,876 | 5/1995 | Ansley et al. | 385/116 |
| 5,450,596 | 9/1995 | Felsenstein | 395/800 |
| 5,451,976 | 9/1995 | Ito | 345/7 |
| 5,469,185 | 11/1995 | Lebby et al. | 345/8 |
| 5,485,172 | 1/1996 | Sawachika et al. | 345/8 |
| 5,491,651 | 2/1996 | Janik | 364/708.1 |
| 5,555,490 | 9/1996 | Carroll | 361/686 |
| 5,572,401 | 11/1996 | Carroll | 361/683 |
| 5,581,492 | 12/1996 | Janik | 364/708.1 |
| 5,606,458 | 2/1997 | Fergason | 359/630 |
| 5,647,036 | 7/1997 | Deacon et al. | 385/27 |
| 5,715,337 | 2/1998 | Spitzer et al. | 385/4 |
| 5,886,822 | 3/1999 | Spitzer | 359/630 |

FOREIGN PATENT DOCUMENTS

WO 98/15868  4/1998  WIPO.

OTHER PUBLICATIONS

"Nonimaging Optics" by Roland Winston, Scientific American, Mar. 1991, pp. 76–81.

"Die Hände werden frei"; Nachrichten Elektronik und Telematrik; vol. 44, No. 4, Apr. 1990, Heidelberg DE, p.154.

*Primary Examiner*—Georgia Epps
*Assistant Examiner*—Ricky Mack
*Attorney, Agent, or Firm*—Patterson & Keough, P.A.

[57] ABSTRACT

A body-mountable display device includes an image source for producing an image, an image transmission device including at least one optically-transmissive fiber, the image transmission device being mountable on the body of a user, projection optics for receiving and relaying the image carried by the image transmission device, and a display for receiving the image from the image transmission device and projecting the image to at least one person. Embodiments of the invention are of significantly reduced size and weight, significantly reduced power consumption and thermal output, and significantly increased durability and reliability. Embodiments of the invention also are more aesthetically pleasing in appearance. Corresponding method embodiments provide similar advantages.

40 Claims, 22 Drawing Sheets

BODY-CARRYABLE DISPLAY DEVICES AND SYSTEMS USING E.G. COHERENT FIBER OPTIC CONDUIT

CROSS-REFERENCE TO RELATED APPLICATION

The subject matter of this application is related to the subject matter of commonly assigned U.S. Provisional Application No. 60/017,232, filed May 9, 1996 and U.S. Provisional Application No. 60/024,851, filed Aug. 28, 1996, both of which provisional applications are incorporated by reference herein and priority to which is claimed under 35 U.S.C. §119(e).

STATEMENT OF FEDERALLY SPONSORED RESEARCH AND DEVELOPMENT

Embodiments of the invention were made with U.S. government support under Contract No. DAA H01-95-C-R063 by the Advanced Research Projects Agency (ARPA). The government has certain rights in the invention.

BACKGROUND OF THE INVENTION

1. Field of the Invention

The invention relates to miniature display devices and systems, and more particularly, to body-mountable display devices and systems compatible for use with wearable computing devices.

2. Description of Related Art

Wearable computing technologies have enormous use-potential in a number of marketplaces, including the military and commercial marketplaces. Commercially, the growth of wearable/portable computing is being fueled by phone, pager, wireless LAN and other options. Markets for wearable computing devices include manufacturing, police, fire, medical, eldercare, transportation, distribution, retailing, and others where hands-free computing allows unimpeded hands-on work. Potential military uses include communications, sensing/imaging, maintenance/inspection, security/intelligence, and medical-related tasks.

Various wearable-computer products are available from ViA, Inc., Northfield, Minn., USA. Attention also is directed to the following U.S. patents, each of which is incorporated by reference herein: U.S. Pat. Nos. 5,581,492; 5,572,401; 5,555,490; 5,491,651 and 5,285,398, all of which are owned by ViA, Inc.

Head-mounted displays are also known for use in a variety of situations. However, typical prior-art head-mounted displays are bulky, heavy and otherwise uncomfortable, generate significant thermal output, and draw significant power. Additionally, many typical devices present an unsatisfactory aesthetic appearance. Further, many typical devices require complicated lensing systems and are otherwise difficult and expensive to manufacture. Typical prior-art devices also suffer correspondingly diminished reliability and durability.

A need has arisen, therefore, for a head-mounted or body-carryable display, especially compatible for use with wearable personal computing devices, that overcomes the above disadvantages.

SUMMARY OF THE INVENTION

To overcome the above and other disadvantages, a body-carryable display device includes an image source for producing an image, an image transmission device including at least one optically-transmissive fiber, the image transmission device being mountable on the body of a user, projection optics for receiving and relaying the image carried by the image transmission device, and a display for receiving the image from the image transmission device and projecting the image to at least one person. Embodiments of the invention are of significantly reduced size and weight, significantly reduced power consumption and thermal output, and significantly increased durability and reliability. Embodiments of the invention also are more aesthetically pleasing in appearance. Corresponding method embodiments provide similar advantages.

BRIEF DESCRIPTION OF THE DRAWINGS

Embodiments of the invention will be described with reference to the figures, in which like reference numerals denote like elements, and in which.

DETAILED DESCRIPTION OF PREFERRED EMBODIMENTS

Figure 1:
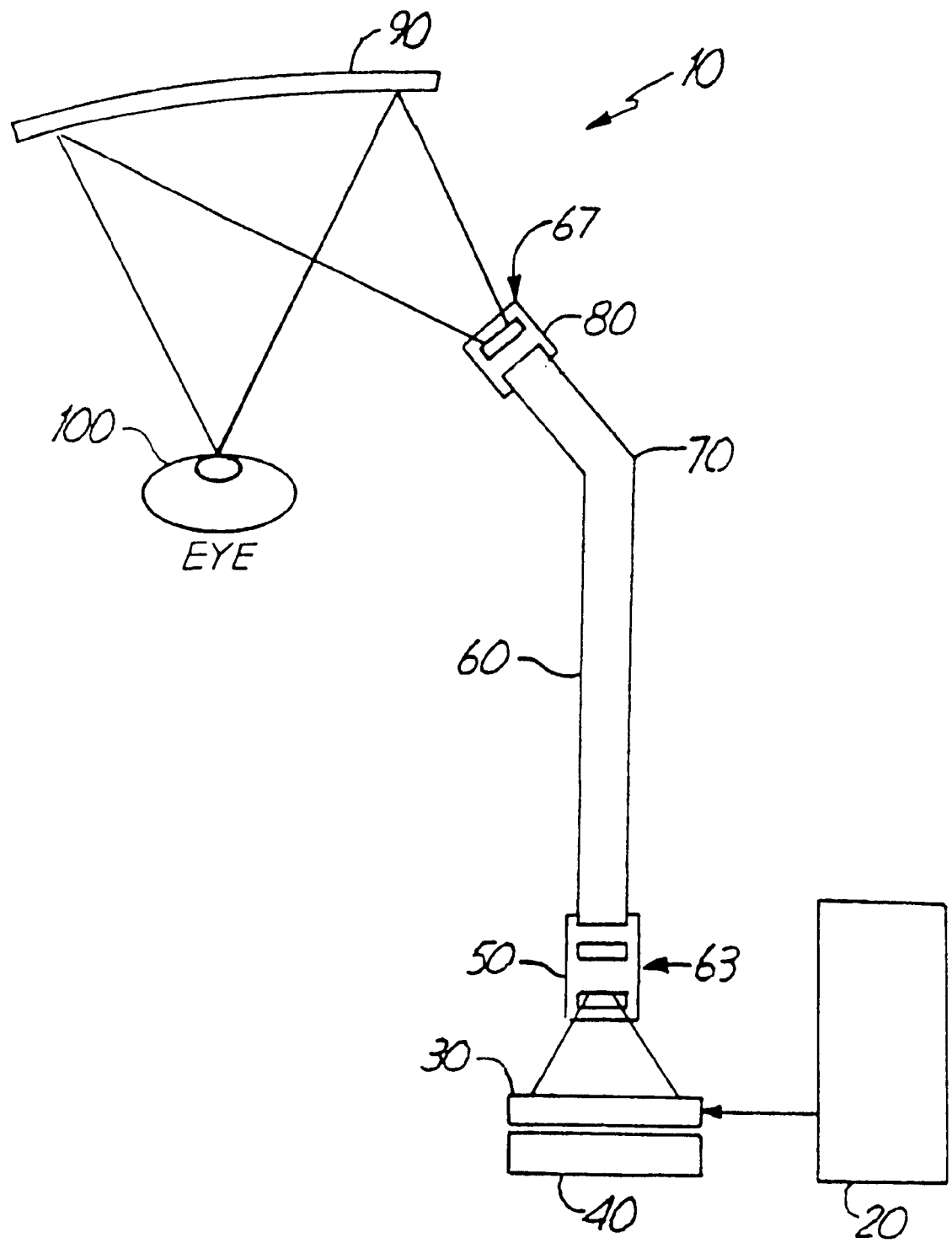
FIGS. 1–3 show display system embodiments according to the invention.

Embodiments of the invention provide various advantages over prior-art head-mounted and other body-carryable display systems. Many prior-art systems, for example, are uncomfortably large and heavy, producing considerable discomfort after only a short period of wearing time. Embodiments of the invention, on the other hand, are quite small, appearing to the wearer to be merely a stick with a spoon-size mirror on the end of it that can be attached to eyeglasses, handheld, mounted onto another readily wearable fixture, or otherwise readily portable, and to be of very light weight. Embodiments of the invention are comfortable to wear for extended periods of time.

Additionally, embodiments of the invention provide aesthetic advantages because they do not unnecessarily detract from the overall appearance of the wearer. This has advantages for a number of environments and applications, for example, a medical doctor attempting to interview a patient, or a police officer attempting to obtain information from a member of the public. Detrimental safety issues associated with large-sized display devices are also apparent, especially in e.g. law-enforcement contexts.

Embodiments of the invention provide color VGA resolution in comfortable, small, easy-to-wear packaging in a manner previously unknown. Significant power savings and well-defined, sharp images, both still and video-type, are achievable. Power requirements and thermal output are drastically minimized compared to prior devices, according to embodiments of the invention. Backlighting merely from ambient light is also contemplated and provides significant power and other savings. Significant lensing and other optical componentry present in prior art devices are eliminated, reducing manufacturing costs and weight and greatly increasing durability.

Further, embodiments of the invention can draw less than about 0.5 W of power, and/or less than about 3.5 W of power, as opposed to many prior art systems that consume up to at least 4–7 watts. Additionally, embodiments of the invention are lightweight, having a mass of less than about 500 grams, preferably less than about 400 grams, and most preferably less than about 300 grams.

Miniature display systems and devices according to embodiments of the invention are designed to deliver VGA or SVGA display capability in a body-mountable or hand-held package. Embodiments of the invention are designed to be compatible with standard PC video output or television-standard NTSC interface signals, and with other current or future signal protocols that may be desirable for particular applications.

Embodiments of the invention can be divided into seven distinct subsystems, including (1) drive and interface electronics, (2) a miniature display, (3) a display light source, (4) imaging optics, (5) an image transmission device, preferably a coherent fiber-optic conduit, (6) projection optics, and (7) a user display, preferably comprising a projection mirror. Several of these subsystems are optional and/or can be combined together with other subsystems. Further, other subsystems, for example, monaural or stereo audio input/output, are compatible with display system embodiments according to the invention. Power can be supplied from an external source or an internal source, as desired.

Turning to FIG. 1, a body-carryable display device 10 includes drive and interface electronics 20 for receiving a video signal from a computer system, equivalent NTSC source, or the like. Drive and interface electronics 20 preferably synchronize and organize the video signal into a set of electrical signals, which are compatible with a miniature display 30, described below.

A typical problem associated with drive and interface electronics generally available in the marketplace is that the associated display devices often require non-standard signal generation. Such display devices generally scan through e.g. red, green, and blue pixels in sequence, whereas as a CRT generally scans through an image only once, generating all colors simultaneously. Typically, therefore, a standard video signal originating at a computer will follow the CRT-type signal protocol, whereas miniature displays suitable for use in a head-mounted or other body-carryable environment will follow more of a sequential protocol, as above. Therefore, custom electronics are used according to the invention to convert the computer-generated signal for proper timing and synchronization. Kopin Corporation, Taunton, Mass., is a supplier of many drive and electronics systems.

Interface and drive electronics 20 can also be directly incorporated into display 30. The MicroDisplay Corporation, San Pablo, Calif., for example, offers a display with associated electronics on silicon, mounted directly with the display. The major bulk of the packaging associated with current head-mounted display devices is to hold all of the associated electronics. Such electronics are generally of relatively large size, requiring associated body mounting devices, wiring, etc. Mounting the electronics on the back of an e.g. 5 mm diagonal chip, on the other hand, eliminates much of the bulk associated with current head-mounted displays and is preferred, according to embodiments of the invention.

As will be described, embodiments of the invention are especially useful with wearable computing devices. One wearable computing device contemplated for use according to the invention can include necessary drive and interface electronics in a very small form factor, on the wearable computer itself, for example. Electronics can also be miniaturized into a PC card or microcard format for easy insertion into a wearable computer, notebook computer, etc.

Turning to miniature display subsystem 30, according to one embodiment this subsystem comprises a two-dimensional array of picture elements, i.e. pixels or the like, which can be turned on and off. Signals from drive and interface electronics 20 control which pixels to turn on and off and control the brightness/grayscale or color of the individual pixels in order to form a complete image on the display. Currently, active-matrix liquid crystal displays offer desirable characteristics in terms of size, weight and power consumption. One such display is a 0.7 inch diagonal 640×480 pixel grayscale display, available from Kopin Corporation. The Displaytech Chrono Color™ miniature display is based on ferroelectric liquid crystal (FLC) technology. This technology provides high-resolution, high image fill factor (active pixel to dead zone area ratio), and LED front-side illumination.

The MicroDisplay Corporation has developed a miniature active matrix LCD device in which the necessary driver electronics are integrated onto the same silicon substrate used for the display. The reduction in overhead in the form of external driver circuitry has very positive implications for miniature display. Such a display is of roughly 5 mm diagonal dimension, at 640×480 resolution and 256 colors—a true VGA display in a 5 mm diagonal package.

Miniature display subsystem 30 should be as small as possible. With a 5 mm form factor, for example, miniature display 30 can be mounted directly on fiber optic conduit 60 or other image transmission system, to be described. With larger form factors, for example, 0.7 inches diagonal, imaging optics 50, also to be described, are used to reduce the image generated by display 30 to a size compatible with conduit 60. Miniature CRT's could be used, but are considerably less desirable because of their size, voltage, power, weight, and shielding requirements.

Display 30 can also be constructed to accommodate and compensate for undesirable distortion features. The MicroDisplay Corporation, for example, contemplates positioning pixels on a substrate in a non-rectangular format, e.g. keystone-shaped or any other desirable shape. Pin cushion and/or keystone distortion, for example, can be compensated for by using a predistorted edge; an opposite distortion is provided, by the manner in which pixels are laid out on the substrate, to generate an ultimate image that is free of distortion. This can allow a flat mirror to be used instead of a parabolic mirror 90, to be described. Eliminating an off-axis parabolic mirror reduces manufacturing costs, although replicated mirrors are of reduced cost and may provide an alternative solution.

The image formed on miniature display 30 is made visible by display light source subsystem 40. Light source 40 can be mounted behind the display as a backlight for transmission-type displays, or it can be mounted to the side or front of miniature display 30 in the case of a reflective-type display. Light-emitting diodes (LED's), incandescent, and cold-cathode florescent tubes are among the illumination sources contemplated for subsystem 40. A diffuser can be associated with the backlight, for example a group of four fresnel lenses grouped to diffuse or spread out the backlight in a desired manner.

A transmissive-type LCD available from Kopin Corporation is of the cold-cathode florescent-backlight type. Such a device provides potentially desirable characteristics, such as a substantially uniformly illuminated background, but requires roughly 50 to 60 volts AC for operation. A circuit card acting as an invertor takes DC voltage from the power source and creates high AC voltage to run the light, requiring significant power and generating heat loss. Therefore, other display types are also desirable for use.

Light source 40 can also include optics or other devices that provide backlighting from ambient light. For example, a small, optionally flexible piece of non-imaging fiber optics with appropriate focusing/funneling features can gather ambient light, for example, overhead florescent lighting, natural outdoor lighting, etc. to provide a backlight. According to one-embodiment, a substantially coneshaped device, silvered on its interior surface, points vertically upward or otherwise toward the likely location of a light source, and is attached to e.g. flexible fiber optic cable or fiber optic conduit at the bottom. The cable/conduit is then coupled to display 30 with a fiber optic taper, for example. Fiber optic tapers are described below. Although backlight-from-ambient embodiments are generally useful only in a lighted environment, power backup can be provided for nighttime use or other use in a darkened environment. For general background information on nonimaging optics, attention is directed to Winston, Rolland, "Non-Imaging Optics" *Scientific American*, March, 1991, which is incorporated herein by reference.

According to a specific LED-backlight embodiment, an array of 3×3 surface-mounted LED's includes combinations of lensing and diffusive materials to convey the array of point illumination sources into uniform illumination. For monochromatic backlit illumination, an LED array is a good choice in terms of size and power requirements. Red and "super red" LED illuminators are especially applicable for night-vision field applications, and green and yellow LED illuminators are both very near the peak human eye sensitivity for easy daylight viewing. Monochromatic LED arrays, however, would not be directly applicable to full RGB color backlight illumination requirements.

A cold filament flat florescent lamp (CFL) manufactured by Sanyo is usable, having 1.3 inch diagonal LCD units. This backlight, however, is nearly 15 mm thick and requires roughly 1.3 W for operation. The physical size and power requirements of this type of unit limit its usefulness in a portable, e.g. wearable system.

Another possible backlight system uses two axial filament subminiature incandescent lamps. Combinations of lensing and diffusive materials similar to that used in LED illumination environments are used to provide uniform illumination from the two line sources. Additionally, reflective materials can be used around the back-side of the lamps to increase the useful amount of light emitted toward the LCD unit.

With embodiments of display subsystem 30 that are of the reflective type, illuminated from the front or side, light source 40 (of whatever type) can route light to display 30 by a beam splitter, such that the light source 40 is mounted at a 90 degree angle out in front of display 30. One embodiment of reflective-type display uses red, green and blue LED's with a diffractive layer on top of the display for lighting from the front or side.

Turning to imaging optics 50, to the extent display 30 is larger than the end of conduit 60, to be described, the original image size must be reduced to a size that will fit into the conduit itself. As LCD's and other display devices become smaller, they become closer to the size of conduit 60 itself, allowing imaging optics 50 to be dispensed with. In that case, display 30 can be butted up directly against the back end of conduit 60. To the extent that display 30 produces an image larger than conduit 60, however, mirrors, lensing, relay lenses, or a fiber optic taper, as will be described with respect to FIG. 2, can be used. Associated mirrors can include both flats, used to fold the image beam should housing space requirements dictate, and aspherics; paraboloids are contemplated for use, for example.

Each of the imaging optics components can be used to bend the light rays emerging from display 30, forming another image at the image side of conduit 60. The modified image most preferably is the same size as or smaller than the area available at the image end of conduit 60, and the conduit acceptance angle, a function of the conduit's numerical aperture/indices of refraction, is preferably compatible with the chosen imaging optics system. Mirrors are preferred, according to one embodiment, because they do not cause chromatic or other aberrations.

Image transmission device 60 comprises at least one optically transmissive fiber for receiving the image from the image source, which includes display 30 as previously described, and for carrying the image for ultimate display to a user of the device. According to preferred embodiment, image transmission device 60 comprises a coherent fiber optic conduit. The coherent nature of the conduit implies that an image formed at a first end 63 of the conduit will be replicated at the other end 67 of the conduit. Conduit 60 preferably is composed of many individual glass fibers fused together into a rigid form. The size of the individual fibers and the total number of fibers required is governed by resolution requirements of the display system.

For best resolution, it is desirable to have as many fiber optic fibers as possible "looking" at a given pixel on display 30. A desired minimum is one fiber per pixel, because fewer than one fiber per pixel quickly degrades image resolution. This is because the entire image is not being viewed and/or because incoherence within a given fiber exists because different pixels are being viewed with the same fiber. The smaller the pixel size of the display, the smaller the fiber size in conduit 60 should be to meet the condition of at least one fiber per pixel.

According to another embodiment, however, if the one fiber per pixel minimum condition cannot be met, imaging end 63 of the fiber optic conduit can be vibrated in at least two directions by at least one electromechanical actuator, causing random movements in an amount of about one or two fiber diameters. Amplitudes as small as one fiber diameter indicate a significant increase of resolution when viewing line-paired targets. See, for example, Kapany, N. S., et al., "Image Transfer on Static and Dynamic Scanning with Fiber Bundles," *J. Opt. Soc. Am.* 47, No. 5, 1957, pp. 423–7, which is incorporated herein by reference. This movement preferably is perpendicular to the longitudinal axis of conduit 60, and increases the sampling of the image source and thus increases the apparent resolution, measured in line pairs per millimeter, of fiber optic conduit 60.

Sampling each pixel also reduces so-called chicken-wire distortion in the image carried by conduit 60. Chicken-wire distortion originates when a fiber views the dark space(s) between pixels. The above-described movement at the end of conduit 63, however, improves resolution of a non-optimal fiber to what can be an acceptable degree. Commercially available piezoelectric transducers (e.g. lead zirconate titanate crystals) to oscillate the end of a rigid conduit are also contemplated.

Another alternative, of course, is to use larger fibers within conduit 60, but this increases the overall size of conduit 60. This likely is not desirable for e.g. head-mounted or other body-carried applications.

According to a preferred embodiment, conduit 60 includes lateral bend 70. Bend 70 can be created by simply heating a straight conduit 60 and bending it from side to side. Alternatively, conduit 60 can be twisted to turn an image to a desired extent, for example, through 90 degrees. Thus, the direction and angle of conduit 60 can be easily changed, in a very small package.

Fiber optic conduit can be obtained, for example, from Shott Fiber Optics, Inc. which currently manufactures conduit with individual fiber diameters down to 12 $\mu$m. For VGA resolution, fiber diameters on the order of four $\mu$m are desirable for conducting a coherent image through a ⅛ inch (3.2 mm) diameter conduit. Given size/weight considerations, this overall diameter appears to be a reasonable upper limit, although of course other diameters are contemplated according to the invention. Fiber diameters down to 3 $\mu$m and below, coated with e.g. black glass extramural absorption material to suppress stray light and increase contrast, are also believed available and are contemplated for use according to the invention.

Alternatively, flexible fiber optic cable can be used, and provides easy and desirable re-directional aspects. Skip-wound (layered) cable and diffused, leached cable offer a means by which high-resolution cable may be built up of smaller fiber bundles. Skip-wound cables are composed of bundles of small-core diameter fibers, layered so as to build up thicker cables of coherent, flexible image conduit. Fused, leached cables are composed of three materials fused together into a coherent bundle; the ends are coated with an acid-resistant coating. The bundle is then immersed in an acid bath, which leaches out the third material. This process leaves the leached area flexible, while preserving the alignment of the two ends of the cable. Resolution concerns due to fiber misalignment, fixed-pattern noise, broken fibers, etc. should be considered and addressed, along with size considerations, in the choice of a flexible fiber optical cable/conduit.

The practical use of flexible or rigid optical fiber cabling/conduit to transmit a coherent image is a function of various factors, including image resolution, cable/conduit size and weight, availability, and cost. A wide variety of fiber optic products are potentially applicable for use in image transmission system 60, and ideally should be evaluated with these concerns in mind.

Matching the demagnified pixel size of display 30 to the optical fiber diameter is a key concern in using fiber optics/image conduit to coherently transmit an image. In the case of matching a 4:3 ratio rectangular-video-format demagnified image to the end of a cylindrical image conduit, the rectangular format's diagonal must be mapped onto the conduit's diameter. In the case of rectangular image conduit or fiber-optic cable, the rectangular form factors should be mapped onto each other. Minimum resolution conditions are established by a 1:1 mapping of pixel to fiber; optimally, each display pixel will be oversubscribed by multiple fibers.

Resolution, in line pairs per minimum, is determined conservatively by R=500/d (static scanning), or R=1200/d (dynamic scanning), where d is the fiber diameter in micrometers. Static scanning refers to viewing a high-contrast target while the fiber-optic cable or conduit is stationary with respect to the target or vice-versa. Dynamic scanning refers to the cable or conduit being in motion with respect to the stationary target, as described above. As may be observed, dynamic scanning at a given fiber diameter may increase available resolution by a factor of over two.

The image to be viewed by the user is transmitted from conduit 70 via projection optics 80. Projection optics 80 comprise various lens elements, according to one embodiment, which relay the image transmitted by the conduit 60 onto e.g., projection mirror 90, to be described. The lens elements are selected to form the proper size image on projection mirror 90, while minimizing the classical lens-induced aberrations. As will be described with respect to FIG. 2, gradient index (GRIN) optics may also be used. Diffractive optics, sometimes called binary optics, can also be used. Such optics combine the optical principles of refraction and diffraction, and e.g. allow removal of chromatic aberration with a single diffractive lens. With classical types of lenses, on the other hand, such removal requires at least a double lens.

Finally, a user display 90 receives the image from conduit 60 via projection optics 80. According to a head-mounted embodiment, user display 90 includes a projection mirror, for example of parabolic shape, placed in front of the eye. An off-axis parabolic mirror is preferred, to allow projection optics 80 to be placed off to the side of projection mirror 90. Projection mirror 90 may be fully reflective, and hence opaque, or semi-transparent, that is, a transparent substrate overlaid with a partially reflective coating. According to one simple embodiment, parabolic mirror 90 is simply machined out of a block of aluminum, and coated.

According to another embodiment, replicated optics are used to create mirror 90. Replicated optics are desirable because one master can be used to create multiple replicas. Typically the replica will have a metallic substrate, which, in this case, can also form part of backing for the outside shell of the housing of the overall display device. An epoxy layer is laid down and the master is pushed into the epoxy such that the epoxy picks up the figure of the master. Once the epoxy hardens, the master is separated from the replica, the surface of the replica is coated with e.g. aluminum in the case of a total reflecting (opaque) mirror, and the aluminum is then overcoated with other dielectric materials to protect the aluminum from oxidizing and from scratches. It is also contemplated to have transparent substrates, in which a glass or plastic-type material can be used, for example, to provide a see-through type user display instead of a completely opaque device. In this case, instead of laying down a relatively thick layer of aluminum, a much thinner layer is laid down so that it is semi-transparent.

Hand-held embodiments are also contemplated, according to the invention. With such embodiments, projection mirror 90 is of a form and in a shape suitable for a hand-held environment.

Figure 2:
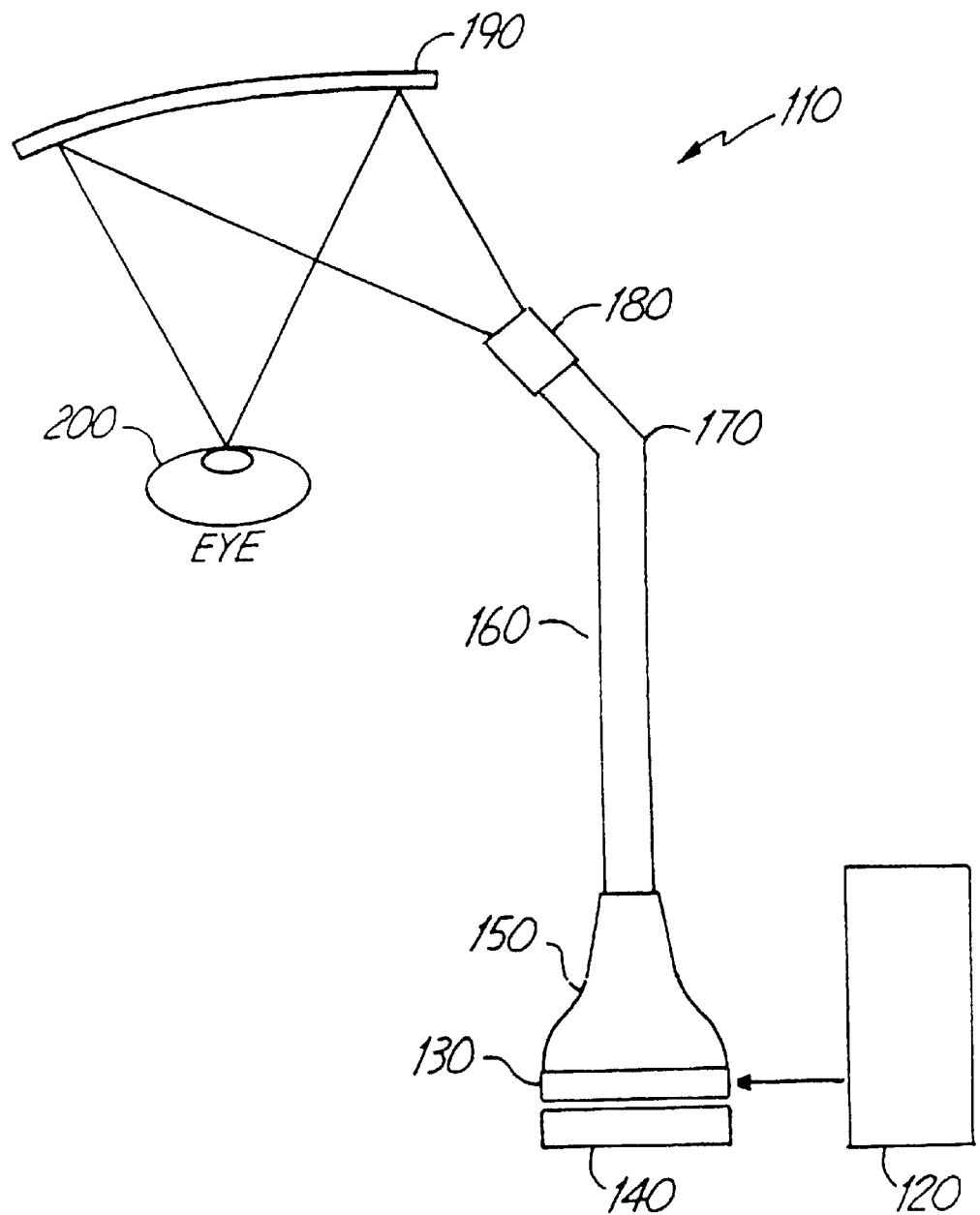
Figure 3:
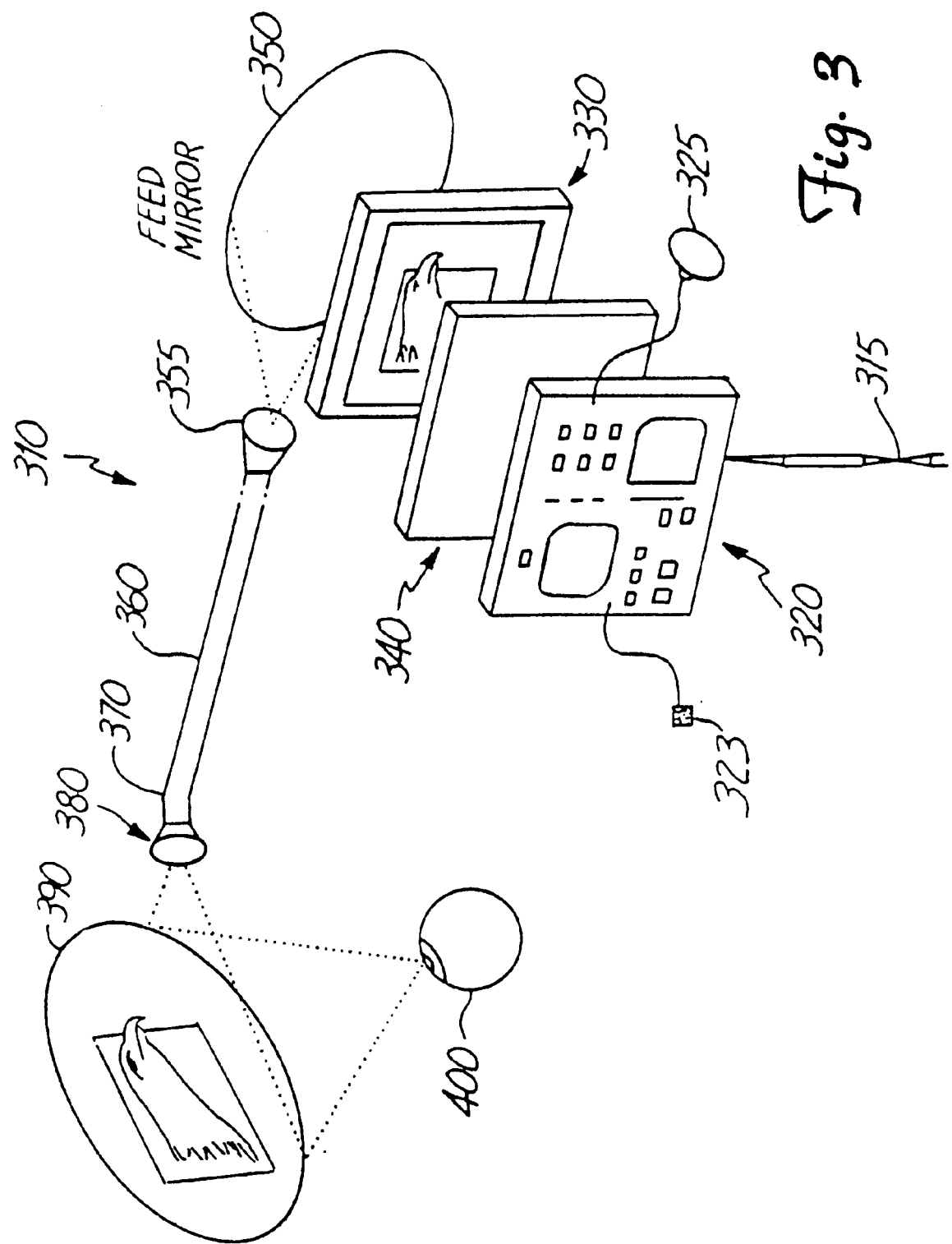
Figure 4:
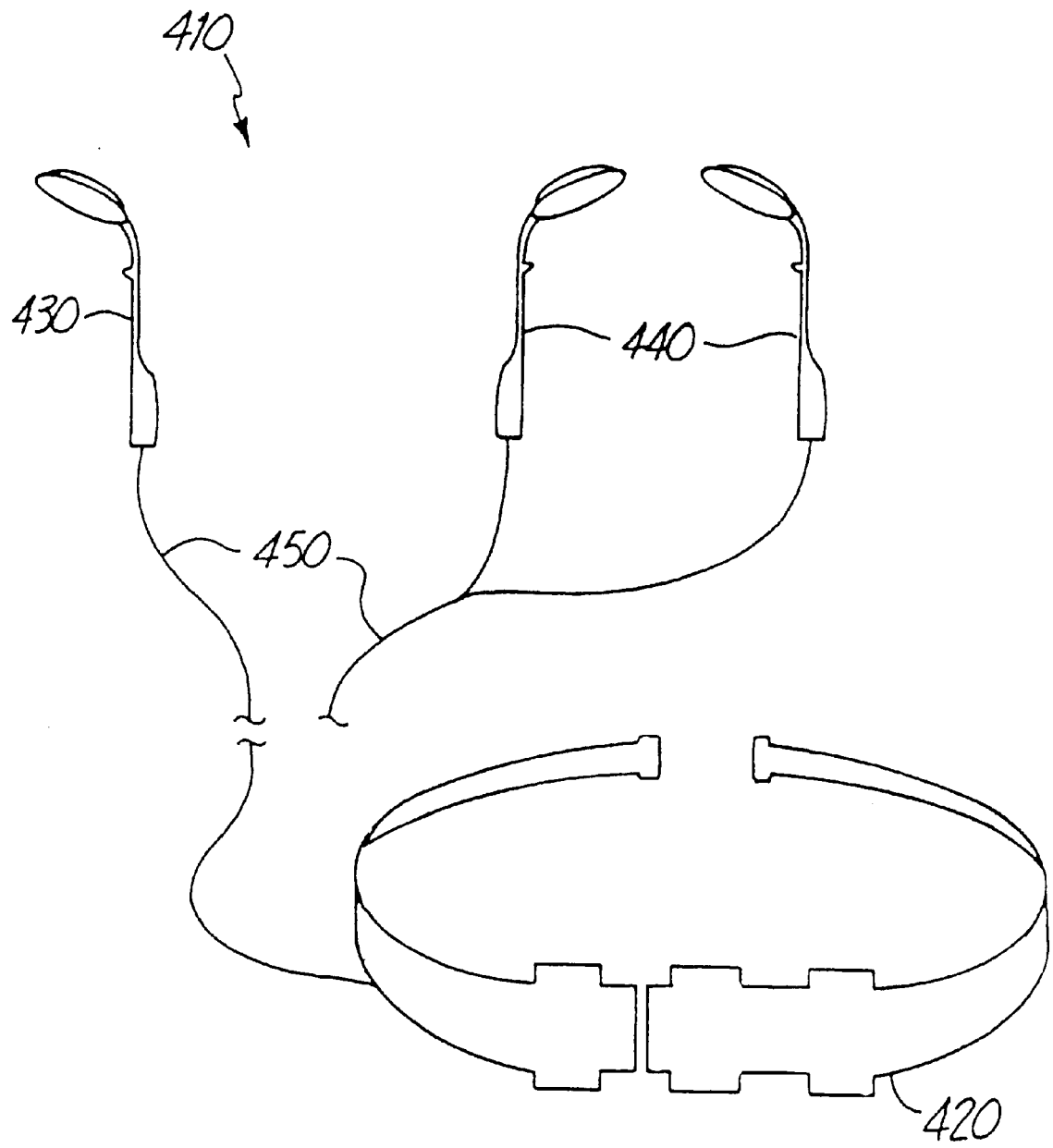
FIG. 4 shows display system embodiments connected to a wearable personal computer, according to an embodiment of the invention.

Turning to FIGS. 2–4, additional embodiments of the invention are illustrated. Like elements between the embodiments of FIGS. 1–4 will not be described separately; the description of one figure applies equally to the others. Further, features of one particular embodiment can be used with other embodiments, both with respect to these figures and throughout the rest of the application.

In FIG. 2, body-mountable display device 110 includes drive and interface electronics 120, miniature display 130, light source 140, and a fiber optic taper 150 into image transmission device 160, which for example coherent fiber optic conduit. According to one embodiment, fiber optic taper 150 comprises a bundle of rigid, coherent optical fibers that have been manufactured such that one end of the bundle is larger than the other. Taper 150 can be used to couple devices and to magnify-demagnify images. Taper 150 also eliminates optical distortion that would otherwise occur using relay lenses or other optics to connect display 130 to conduit 160. This is especially desirable as resolution increases, for example to VGA resolution, where pin cushion and/or chromatic aberration would otherwise be heightened.

Conduit 160 optionally bends at 170 and terminates with gradient index (GRIN) lens element 180, briefly referenced above. GRIN optics can be molded into a flat or cylindrical shape and yet have a changing index of refraction inside their volume for bending of light. The index can change along the axis of the lens, or radially out from the center to the edge, for example. Thus, multiple lenses can be replaced with a single GRIN lens.

Projection mirror 190 then provides the image to the user's eye 200.

Turning to the FIG. 3 embodiment, display device 310 includes electrical wires 315 for power, data, voice i/o, etc. communication with an external device, such as a wearable computing device. Of course, other transmission vehicles, e.g. wireless, fiber optic, etc. are contemplated. Connected to control electronics 320 are microphone 323 and speaker 325, again via wires (as illustrated) or other means. Display 330, for example an LCD display, is backlit by light source 340 for transmission of an image to feed mirror 350. The image then is received at image optics 355 for transmission to fiber optic conduit 360, through bend 370 and then via projection optics 380 and mirror 390 to the wearer's eye 400.

FIG. 4 illustrates display system embodiments 410 for operative connection to wearable personal computer 420. Wearable personal computer 420 is connected to a single display unit 430 or to multiple display units 440 by electric wire harness 450 or other transmission vehicles, as described above. Embodiments of the invention illustrated in FIG. 4 are especially applicable to multimedia display units for three dimensional graphics capabilities, for example, as will be described below. Further, the FIG. 4 embodiments are especially applicable to display units 430 and/or 440 having a flexible design with memory, made of various materials (e.g. plastic or metal), that are bendable, hinged, or rigid, as elaborated elsewhere in this application.

Multimedia display unit embodiments are illustrated in FIGS. 5–13. The multimedia units disclosed in FIGS. 5–13 can be connected to a computer, for example, a wearable personal computer, by a connection device associated with e.g. a data port, as will be described. The connection device can include various electrically conductive wire(s), fiber optic cabling, infrared or other wireless transmission systems, etc.

Figure 5:
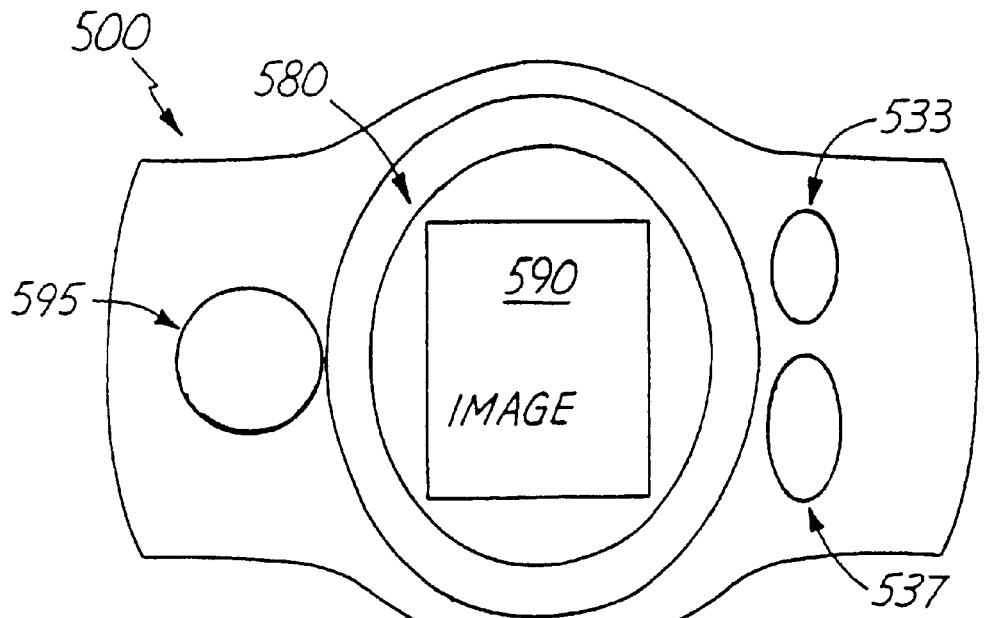
FIGS. 5–6 show a multimedia display ring, according to an embodiment of the invention.
Figure 6:
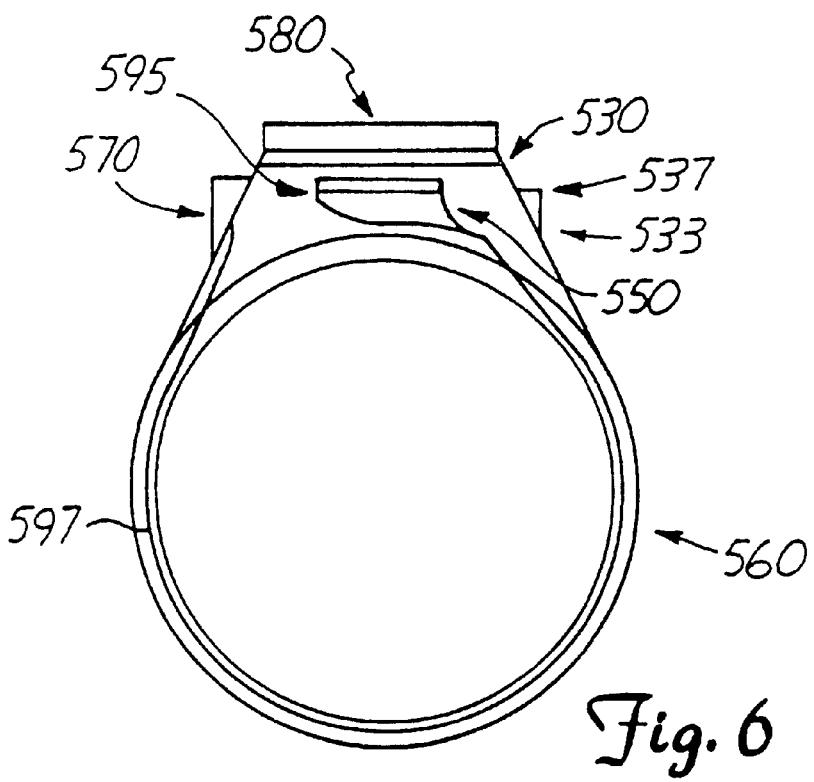

Fiber optic conduit 560, being readily bendable and shapeable as described above, is easily adaptable to be a part of a variety of body-worn or body-carried devices, such as a ring-type device. As shown in FIGS. 5–6, for example, ring embodiment 500 includes display 530, for example, an LCD display, microphone 533 and speaker 537 associated with appropriate control electronics, and a fiber optic or other type taper 550 leading into fiber optic conduit 560 or other image transmission device. Appropriate imaging optics 570 and display optics 580 also are provided, for ultimate presentation of image 590 to a wearer of the ring or to another viewer. This embodiment also optionally includes camera 595, preferably of the CCD type, to provide simultaneous image transmission and image viewing e.g. in a telecommunications environment.

To accommodate image transmission from camera 595, a second fiber optic conduit 597 can be provided, either as a separate ring associated with conduit ring 560 or as one-piece with it. Camera 595 can be used to create an image of the wearer, the wearer's surrounding environment, or other features. The image is then fed back through appropriate cabling or other signal transmission device to a wearable or other personal computer that gathers the image. Alternatively, or in addition, the image can be sent wirelessly to remote locations in connection with e.g. surveillance or other operations.

Further, the dual conduits 560, 597 can be constructed to slide relative to each other, allowing the wearer of the ring to aim the camera 595 at e.g. his or her face, to show a remote party a picture of himself/herself, while simultaneously viewing an image of the third party, either projected from or within the ring itself. Alternatively, the camera can be rotated to allow the third party to see what the wearer/user is seeing. Two different rings can also be used to provide camera and display functions, although a single ring is preferred because it allows just one cable or other connection device to route data between the ring and the wearable or other personal computer, or other remote device. In the case of a single cable, a number of signal-conducting devices preferably is just sufficient for both image-in and image-out capability.

A number of miniature microphone and speaker embodiments are contemplated according to the invention. Preferred miniature speakers will offer good low-frequency response, which is very desirable for voice-based applications. Moving-coil transducers are preferred over miniature piezoelectric transducers because of their more desirable low-frequency response. For microphones, active noise-canceling directional elements are desirable. A wide variety of audio input transducers and output devices are contemplated. Choice of microphone and speaker generally can be made without substantially affect the rest of the display system.

Figure 7:
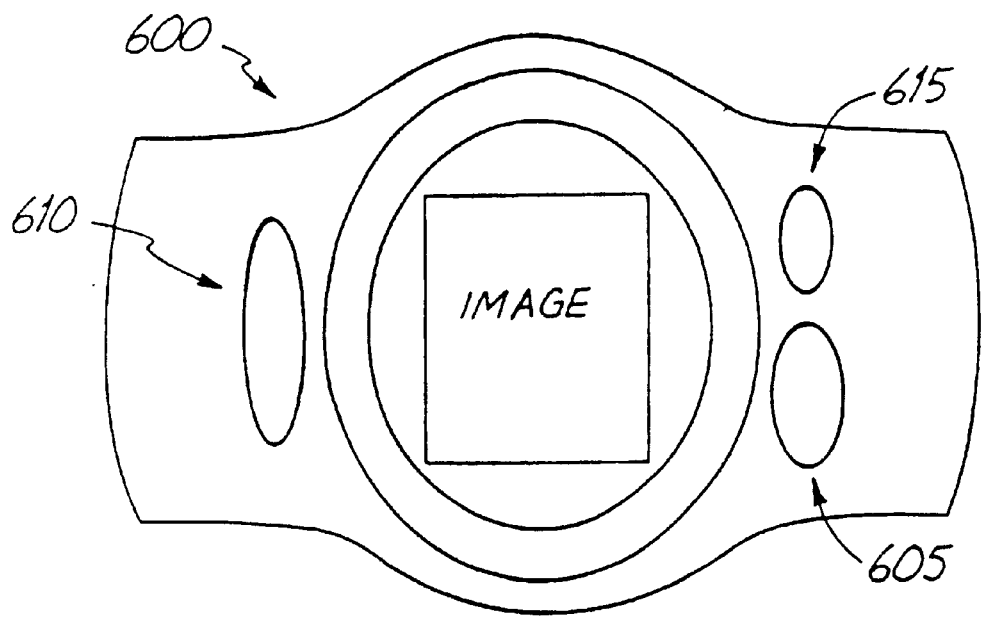
FIGS. 7–8 show an alternative multimedia display ring embodiment according to the invention.
Figure 8:
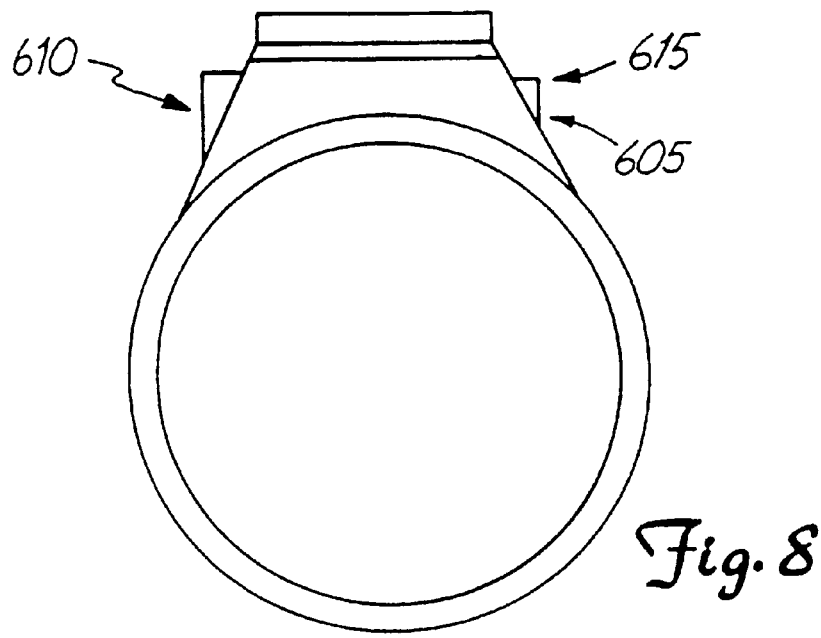

FIGS. 7–8 illustrate another ring embodiment 600, which is similar to ring 500 but includes microphone 605 on one side of the ring and speaker 610 on the other side. This embodiment also includes data port 615, which preferably is a data-in data-out port for communication with e.g. a personal computer. Other elements are as illustrated with respect to FIGS. 5–6, and the various features of the two embodiments can be combined together and/or selected for use as desired in a particular application.

Figure 9:
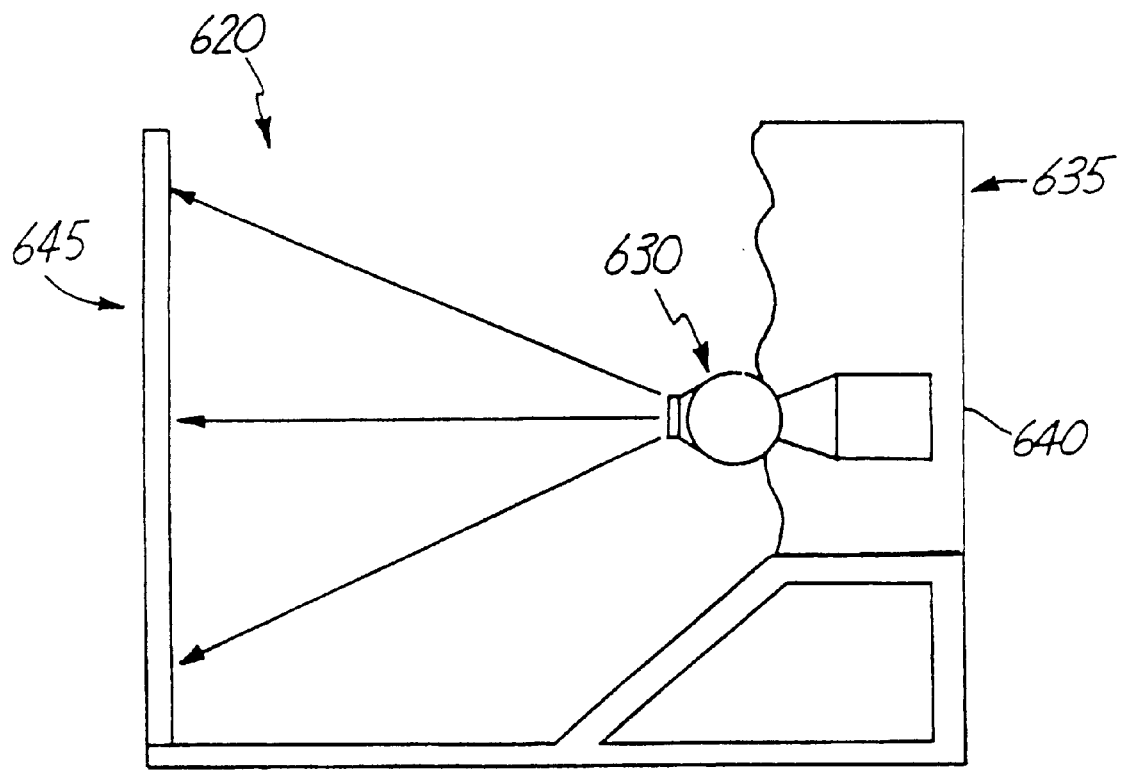
FIGS. 9–11 show a projection ring embodiment according to the invention.
Figure 10:
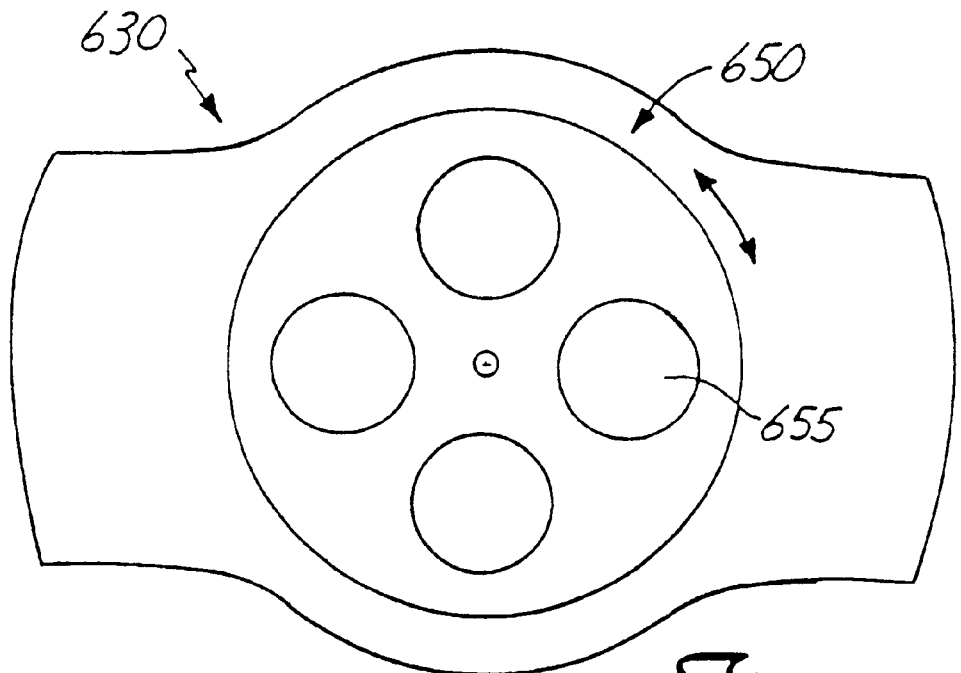
Figure 11:
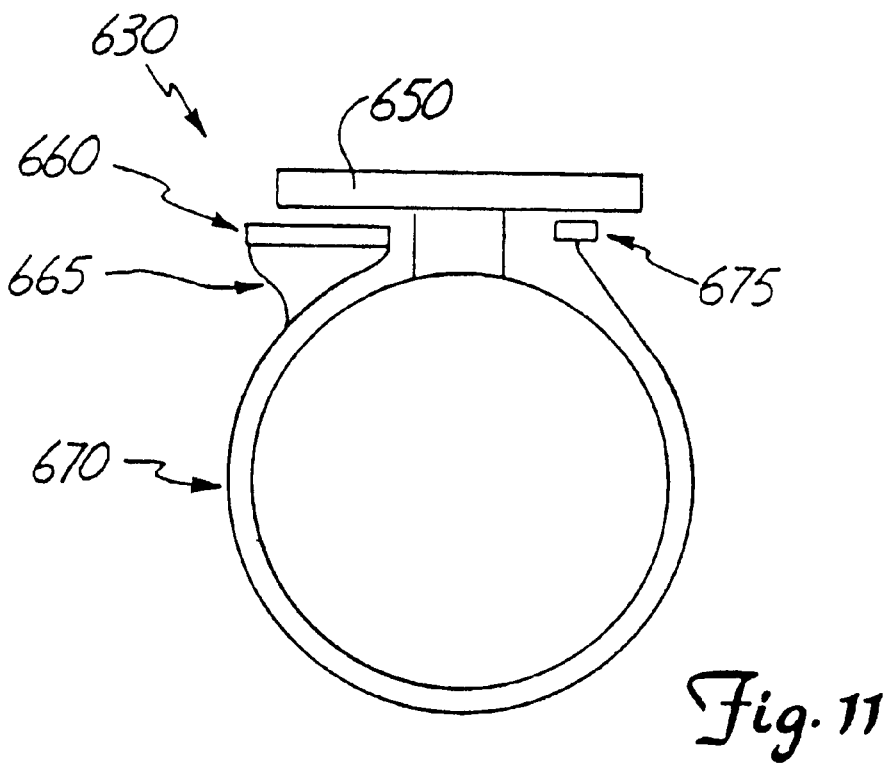

FIGS. 9–11 depict a projection system 620, in which ring 630 is optionally removed from the wearer's finger and mounted in a pistol-grip device 635. According to one embodiment, a user removes the ring from the finger and slides it over a mounting finger or other suitable support structure on the pistol-grip device 635. Other mounting functionalities are also contemplated. Auxiliary light source 640 functions as a powerful backlight to project the image via ring 630 to a display screen 645, which can be a considerable distance from the ring for viewing by a number of people. Screen 645, for example, can be a cubicle wall, the wall of a traditional room, a movie screen, etc.

As shown in FIGS. 10–11, projection ring 630 can include rotating wheel 650 for providing alternative projection optics for selection by a user. Projection optics e.g. in the form of lenses 655 can be provided in wheel 650, for example, to provide different focal lengths for projecting an image at various ranges. Alternatively, a fixed-focused set of lenses is also contemplated. One of the sets of projection optics 655 can uncover a backlight, allowing the ring to be placed in the vicinity of an intense fiber optic or other light, such as source 640 above. This provides virtually an infinite range and/or a relatively large image for projection on an object such as a distant wall. The high resolutions associated with silicon-based video products described earlier provide extremely effective projections of this kind, without cumbersome size. Projection ring 630 also preferably includes LCD or other display 660, taper 665, conduit 670, and appropriate relay optics 675.

Figure 12:
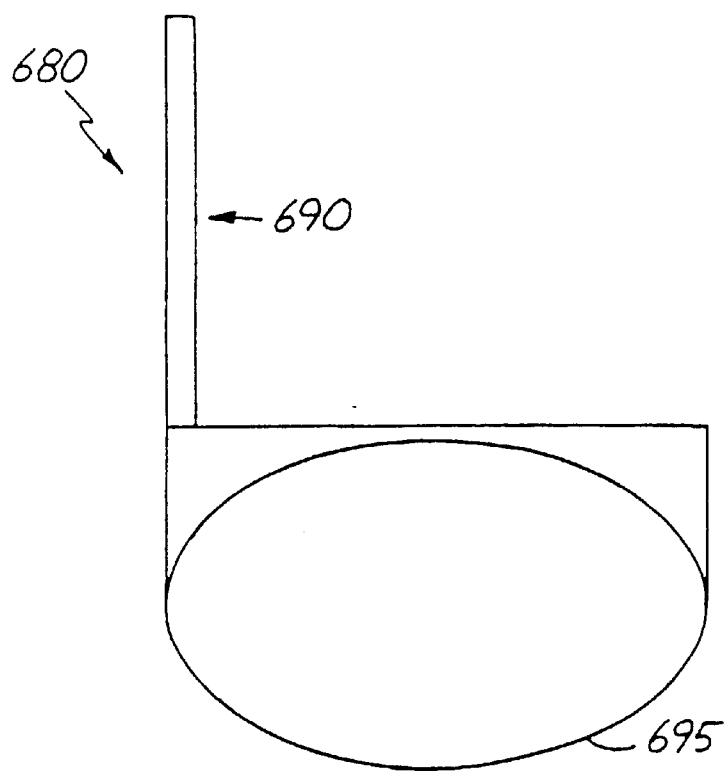
FIGS. 12–13 show a wrist-mounted multimedia unit according to an embodiment of the invention.
Figure 13:
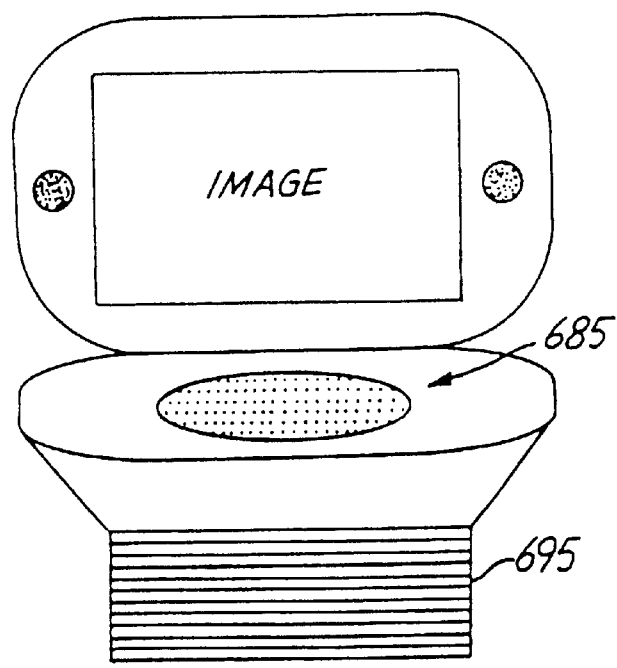

FIGS. 12–13 illustrate e.g. a wrist-mounted multimedia unit 680, which can include miniature color VGA display technology, audio I/O, and video input. A cable or other connection to a wearable PC, and/or a wireless audio/video link, of at least 900 MHz, for example, can optionally be employed. Features of the previously described embodiments, for example, camera, microphone, speaker, fiber optic conduit and other features can be incorporated into device 680, as desired. Speaker 685, for example, can be located as illustrated in FIG. 13, to be covered by hinged display screen 690 when device 680 is not in use. Wristband 695 can be used to secure device 680 to the wearer's wrist or leg or other desired appendage or structure.

Recent advances in miniaturization technology relating to video display screens and associated optics are well-suited to the embodiments of FIGS. 5–13, as well as previous embodiments.

Various devices for mounting the overall device directly on the body are also contemplated, for example a pull-down necklace-type mounting arrangement, a wristband, and/or bands or springs for mounting the device over or around the head, any or all of these examples using VELCRO-type fasteners and/or allowing hands-free operation. Additionally, different holding devices are contemplated to secure the illustrated off-axis parabolic display mirror and associated coherent fiber optic conduit in place on an article or articles worn by the user. For example, clips for attaching to glasses or other eyewear or headwear are contemplated. The conduit can be bent to accommodate the morphology of the body, for example around the top, back and/or sides of the head, for providing an image to either or both eyes. The conduit can also be bent to hook onto a belt or other article of clothing. It is also contemplated that the conduit can be made of relatively extensive length, due to its low-attenuation/dispersion characteristics. Coherent rods and the associated, abovedescribed display devices can also be incorporated in hats/helmets, for example. However the device is supported, it is contemplated that the user can move the device from position to position, on or off the body, at will.

Figure 13A:
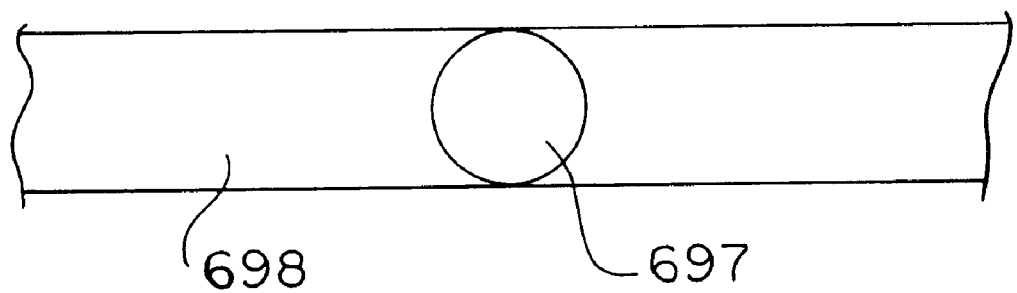
FIG. 13A schematically illustrates a fiber optic conduit with ball lens.

A wrist-held device is also contemplated, to support the disclosed display system so that it can readily snap from the wrist into the palm. According to one embodiment, the coherent fiber optic conduit folds at some point along its length to allow the display mirror to snap easily and comfortably into the palm, for example by using ball lens 697 at a desired position along coherent fiber optic conduit 698, as shown schematically in FIG. 13A. Alternatively, the entire conduit can snap into the hand via an off-conduit pivot point. The hand thus provides protection from ambient light, and the user can access, view, and retract the display device without having to use fingers or a hand to grab, hold or attach it. Handheld display mirrors and/or other components allow the user to project an image to a desired location while cupping away ambient light and thus providing greater power savings. Similarly, pop-up pocket fobs are contemplated for use with the invention, providing automatic shading by a pop-up screen or cover that moves into position upon squeezing of the fob.

According to a stereo and/or two-display-mirror embodiment, such as is illustrated in FIG. 4, two display mirrors are used, one associated with each of the wearer's eyes. A voice interface is optionally included to interact with the driving software, allowing the projected image(s) to be shifted from one eye to the other, or both eyes, at will upon voice command. Additionally, voice commands can be used to drive the image(s) in reverse and/or upside down configurations as desired for a particular application.

According to embodiments of the invention, different snap-on optics and/or reflectors for different-shaped fields of view can be used. Instead of being permanently affixed, display mirrors according to the invention and other associated lensing can be removably affixed to the end of the conduit, allowing damaged optical components to be readily replaced. Length-adjustable optics are also contemplated, to adjust the focal length/size of the image for projection purposes, or to a person's eyesight to avoid the need for eyeglasses.

A protective rubber-type doughnut arrangement is also contemplated, to surround and protect the display mirror and/or other associated optical components. Embodiments of the invention can be also embedded in a lithium-ion polymer battery, which can drive the video or other image output capabilities. This eliminates the need for much of the otherwise-required wiring, and is directly applicable to wireless, LAN or bodyLAN applications.

Figure 14:
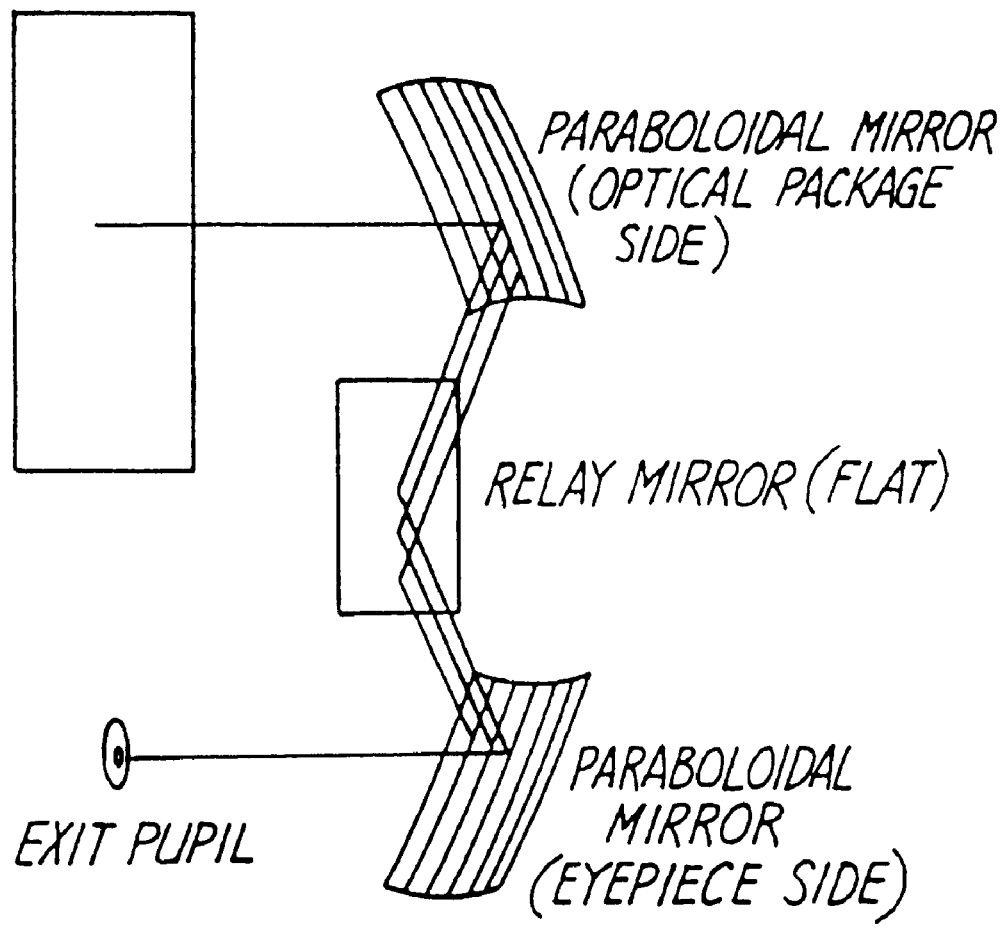
FIGS. 14–17 show system optics according to an embodiment of the invention.

For embodiments in which it might be undesirable to use higher-resolution fiber optic conduit, twin parabolic mirrors can be used for projection optics 80, as illustrated in e.g. FIG. 14. FIG. 14 represents a generic, 26° (horizontal) by 20° (vertical) scaleable twin parabolic mirror system with advantages of no chromatic or spherical aberration, and no coma. Elimination of chromatic aberration occurs due to the use of all reflecting components. Spherical aberration is eliminated by the choice of surface curvature. Coma, the condition in which bundles of light come to focus as a function of angular displacement from the optical axis, providing fuzziness towards the edge of the field of view, is eliminated by the choice of system geometry. A "Z" configuration (in which upper and lower legs of the "Z" represent rays emanating from the foci, and the diagonal member represents the relayed bundle of light) eliminates coma. According to one embodiment, an odd number of flat mirrors can be used to fold the relayed beam; an even number of relay mirrors might accentuate coma.

The system of FIG. 14 offers approximately 43 mm of eye relief for a 5 mm diameter pupil. This relatively large stand-off distance allows for a distance up to 25 mm (approximately one inch) between the eye's surface and the nearest projection structure. The relatively large size of this system reflects use of a large-format LCD or other display, although smaller-format display formats are also available. Without the use of optical conduit/cable, the horizontal dimension of the LCD may be reduced using fold mirrors, by at most a factor of √2. This embodiment, however, allows inclusion of a generic optical interface. This interface is conceptually responsible only for spreading the light bundle from a virtual focus. Any applicable optical system, including a fiber optic cable/conduit, may reside behind this interface. For large-format LCD's or other displays, a telecentric relay lens assembly most preferably conducts an image from the display's active area to the optical interface, albeit at the inclusion of chromatic and spherical aberrations.

Figure 15:
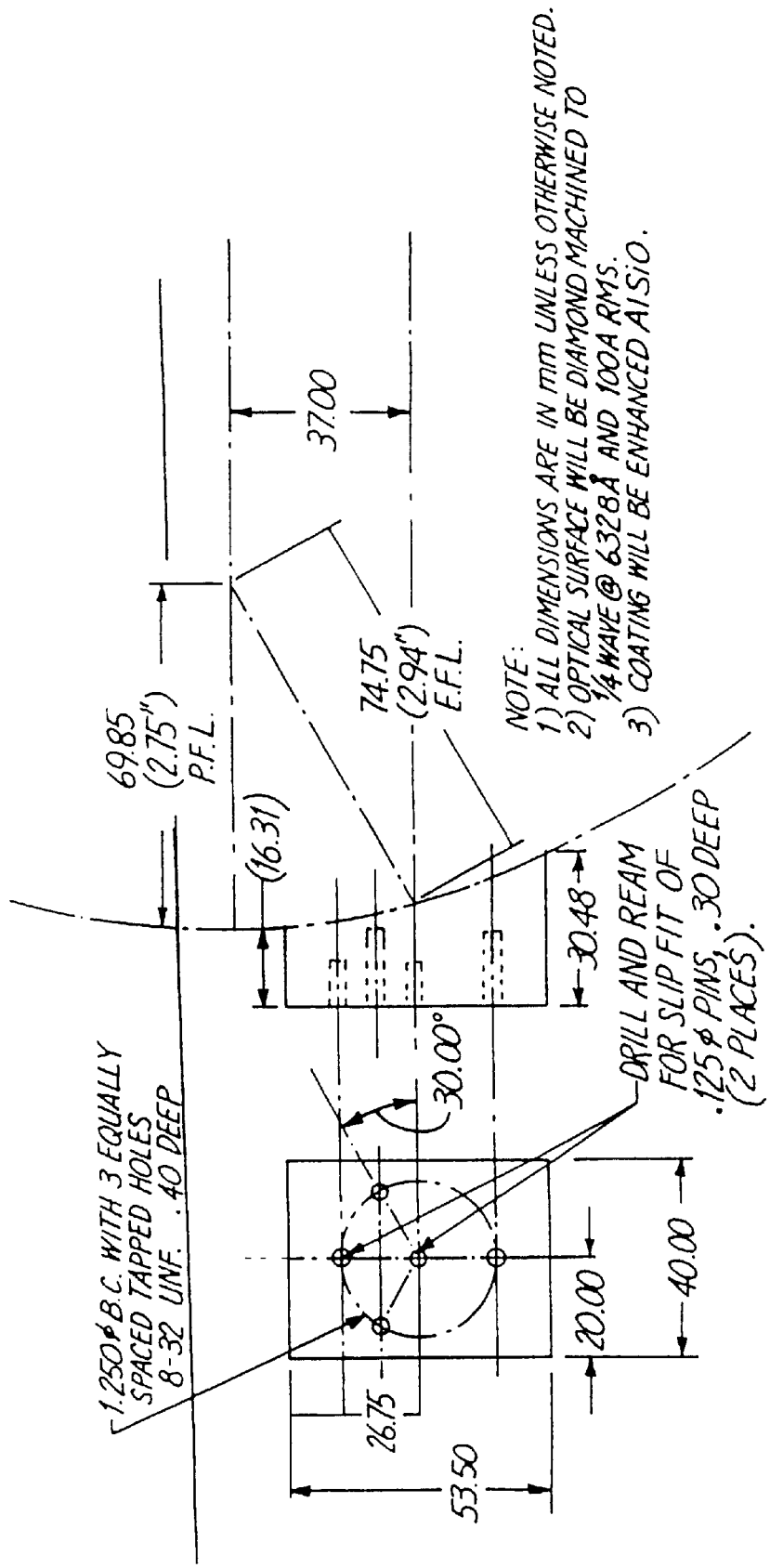
Figure 16:
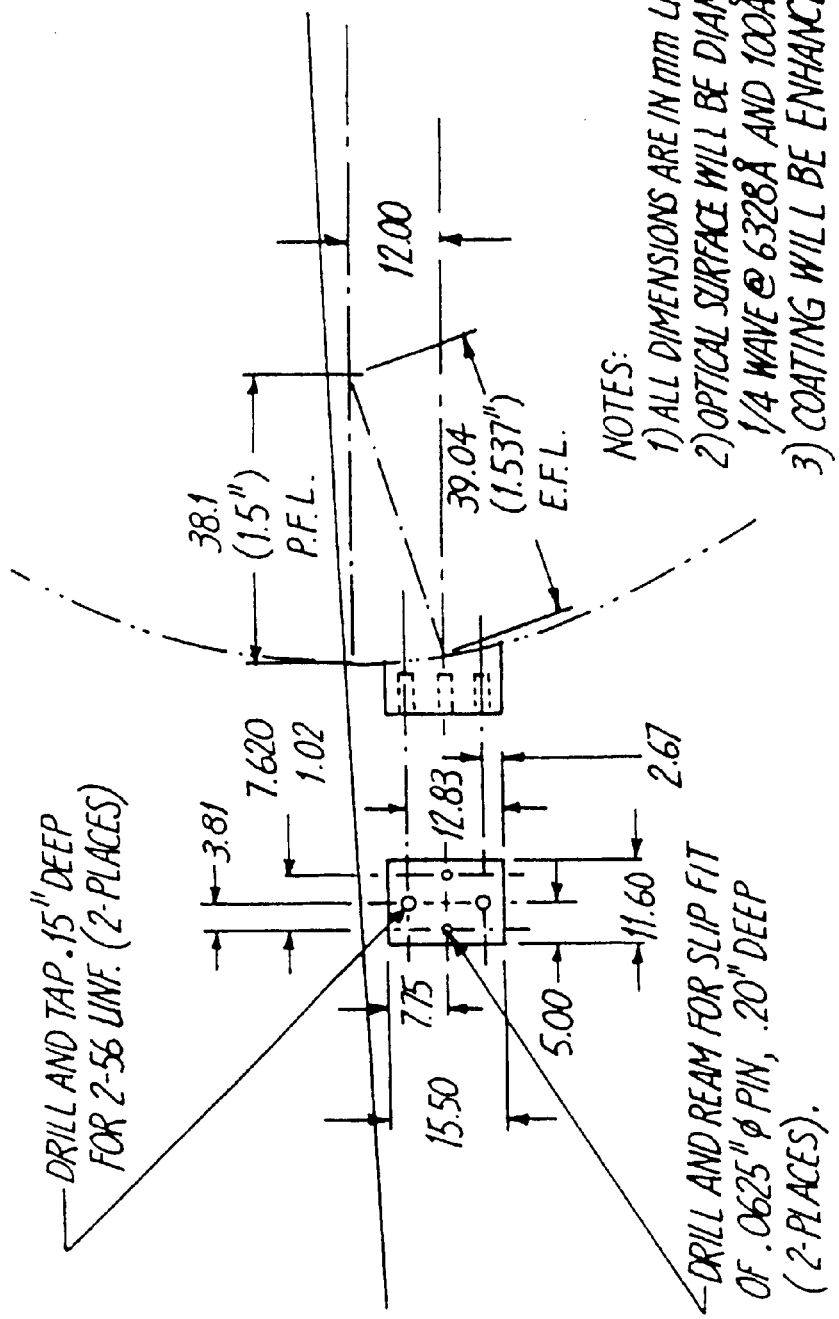
Figure 17:
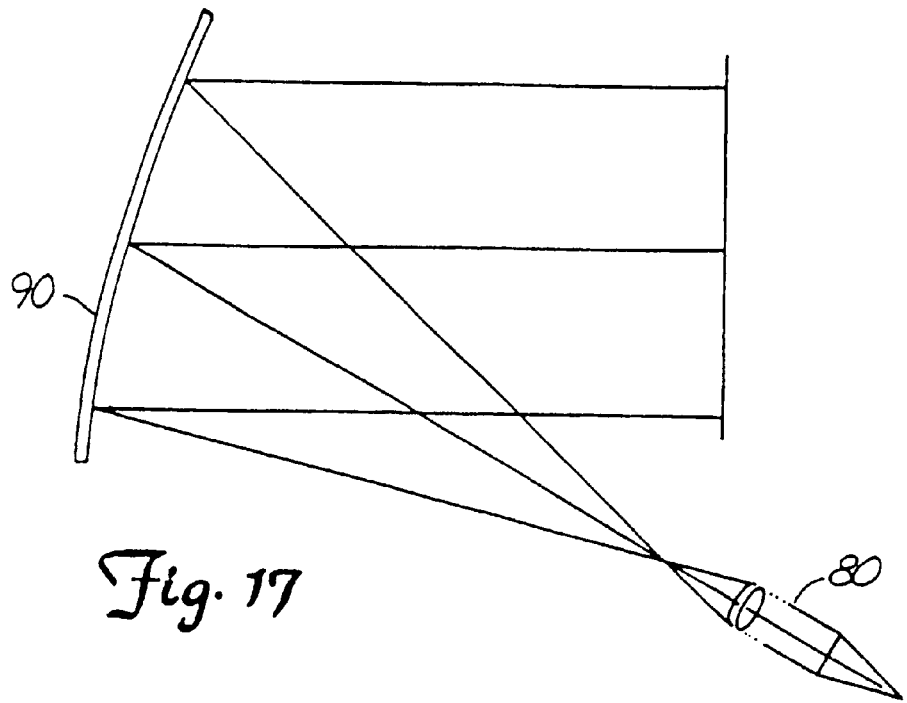

FIGS. 15–16 show specific embodiments contemplated for projection mirror 90 and a parabolic mirror for use in imaging optics 50, respectively. FIG. 17 is an overhead view showing light-beam transmission from an embodiment of projection optics 80 to projection mirror 90 and on to the wearer's eye.

Figure 18:
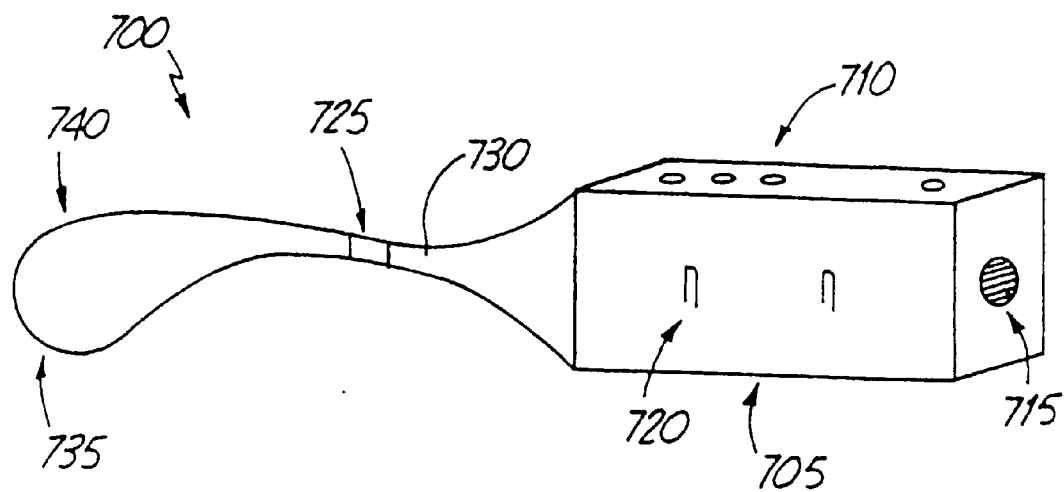
FIG. 18 show a multimedia display unit embodiment according to the invention.

A conceptual drawing of an additional multimedia display unit is shown at 700 in FIG. 18. Display housing 705 contains a miniature LCD or other type display, control electronics, parabolic feed mirror, image optics, and the beginning of the coherent fiber optic conduit, according to the illustrated embodiment. Operating controls 710, such as an on/off switch, volume control, backlight control, etc., are disposed on an upper portion of housing 705, and speaker output 715 on a side thereof. A wall portion of housing 705 can advantageously include headgear mounting brackets 720, for easy mounting on a wearer's eyeglasses, body or clothing, for example.

Projection optics 725 at the end of coherent fiber optic conduit 730 feed to an off-axis parabolic display mirror 735, which is in the form of a collapsible display "spoon" 740. An associated audio system comprises a small speaker for audio output, a miniature microphone for audio input, and the various electronics associated with both. This system allows voice input for e.g. a wearable personal computer, and it provides sound-output capability for multimedia applications.

Figure 19:
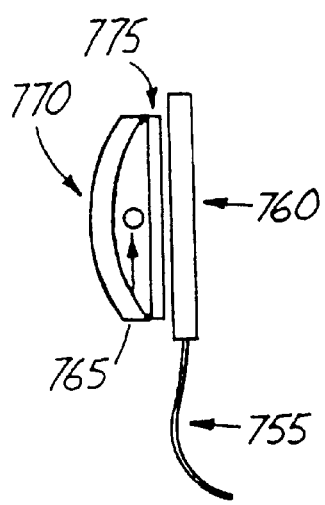
FIGS. 19–20 show a miniature LCD projection display system according to an embodiment of the invention.
Figure 20:
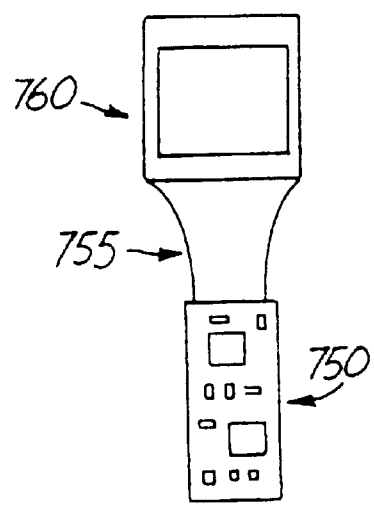

FIGS. 19–20 illustrate a miniature LCD projection display system according to an embodiment of the invention. Video driver circuitry 750 connects via flexible PCB connector 755 to TFT-LCD display 760, which is in operative association with light source 765, reflector 770, and diffuser 775 in a manner apparent from viewing the figure.

Figure 21:
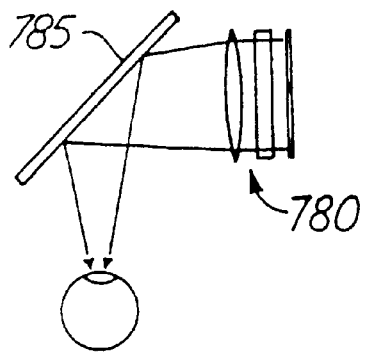
FIGS. 21–24 show projected-view display systems, according to embodiments of the invention.
Figure 22:
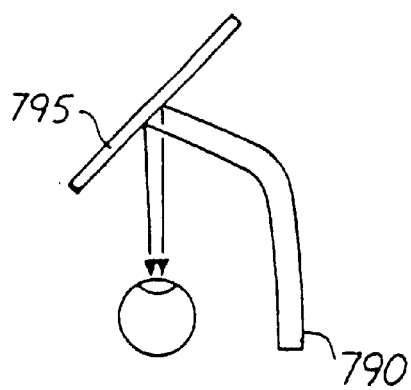
Figure 23:
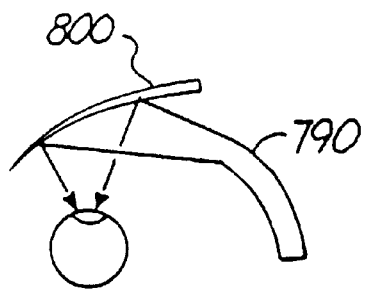
Figure 24:
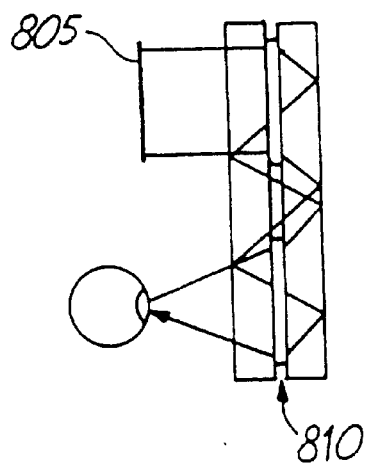

FIGS. 21–24 illustrate four possible optical configurations for delivering an image from an LCD projection or other type display to the eye of a wearer. FIG. 21 illustrates a simple reflex design, with LCD, microlouver, and lens sandwich assembly 780 directing light to the eye via beam splitter 785. FIG. 22 illustrates a simple reflex with a fiber optic conduit and associated projection optics 790, using beam splitter 795. FIG. 23 illustrates a parabaloidal off-axis-feed embodiment using fiber optic conduit and projection optics 790 with a parabaloidal beam splitter 800. Finally, FIG. 24 illustrates a holographic embodiment, wherein the image on LCD or other type display 805 is transmitted to the eye via holographic elements 810.

Figure 25:
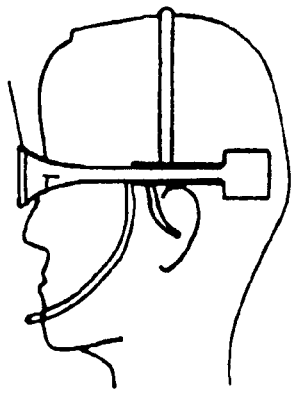
FIGS. 25–32 show various embodiments of the invention supported on a wearer's head.
Figure 26:
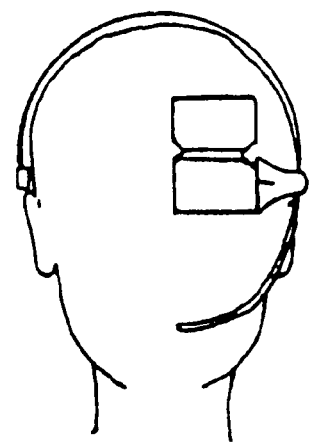

FIGS. 25–26 illustrate another embodiment according to the invention. Supported on a wearer's head, this embodiment preferably includes a single 640×480 display, stereo audio output, a single audio input, and quick flip-up/down shading for viewing enhancement and replacement operations.

Figure 27:
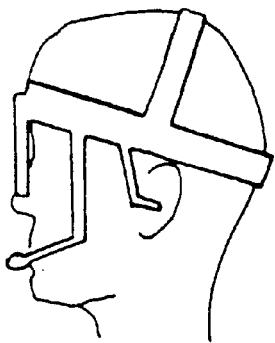
Figure 28:
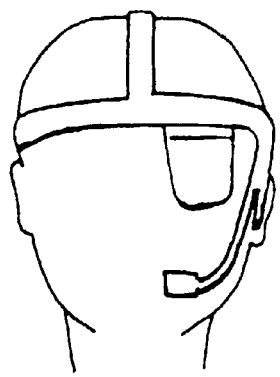
Figure 29:
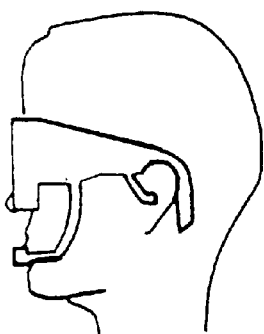
Figure 30:
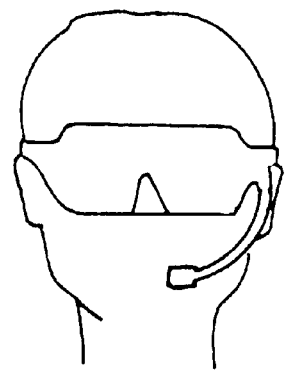
Figure 31:
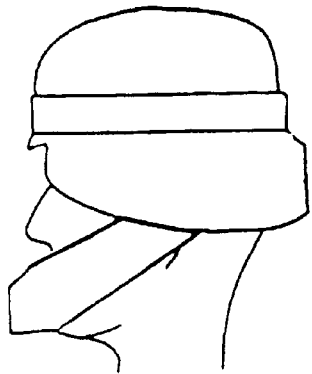
Figure 32:
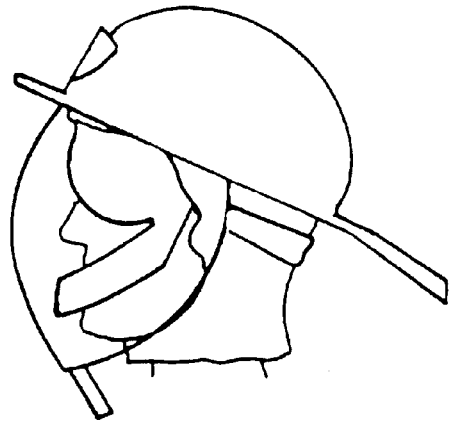

Additional head-mounted platforms are illustrated in FIGS. 27–32. FIGS. 27–28 illustrate a monocle headset embodiment, having single or dual images, audio input/output, and quick flip-up/down design. FIGS. 29–30 illustrate a goggle headset embodiment, having dual images and audio input/output. Goggle headset embodiments are particularly useful in dusty and/or smoky environments. FIGS. 31–32 illustrate a face-plate design in connection with military-style or fire-fighting helmets, with dual images, and audio input/output. These embodiments also allow full peripheral vision, according to a preferred embodiment.

According to other embodiments, a center-feed conduit embodiment positions projection optics at or near the center line of the wearer's head, and the image is projected outboard. The beam-splitter plane can be placed almost parallel to the user's cheek. An LCD or other display can be mounted in a location to the sides of the headset (horizontal beam) or above the eyes (vertical beam). Conversely, the fiber-optic conduit projection system can be fed from the center of the headset, over the bridge of the nose (horizontal beam) or in almost any other orientation. In terms of location, then, the fiber-optic conduit, according to embodiments of the invention, is very flexible and desirable.

Figure 33:
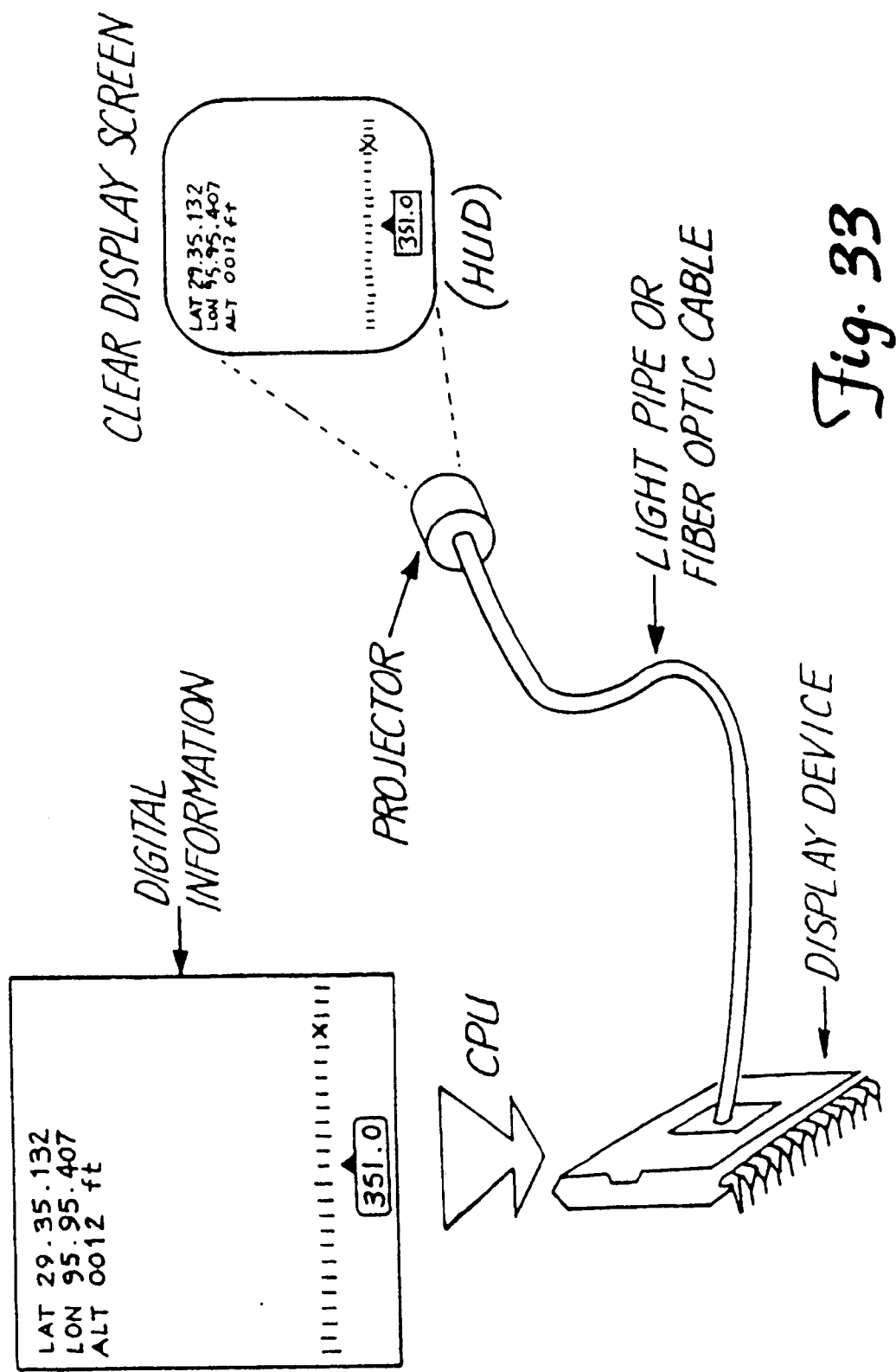
FIGS. 33–34 show projected-image and digital-display systems according to embodiments of the invention.
Figure 34:
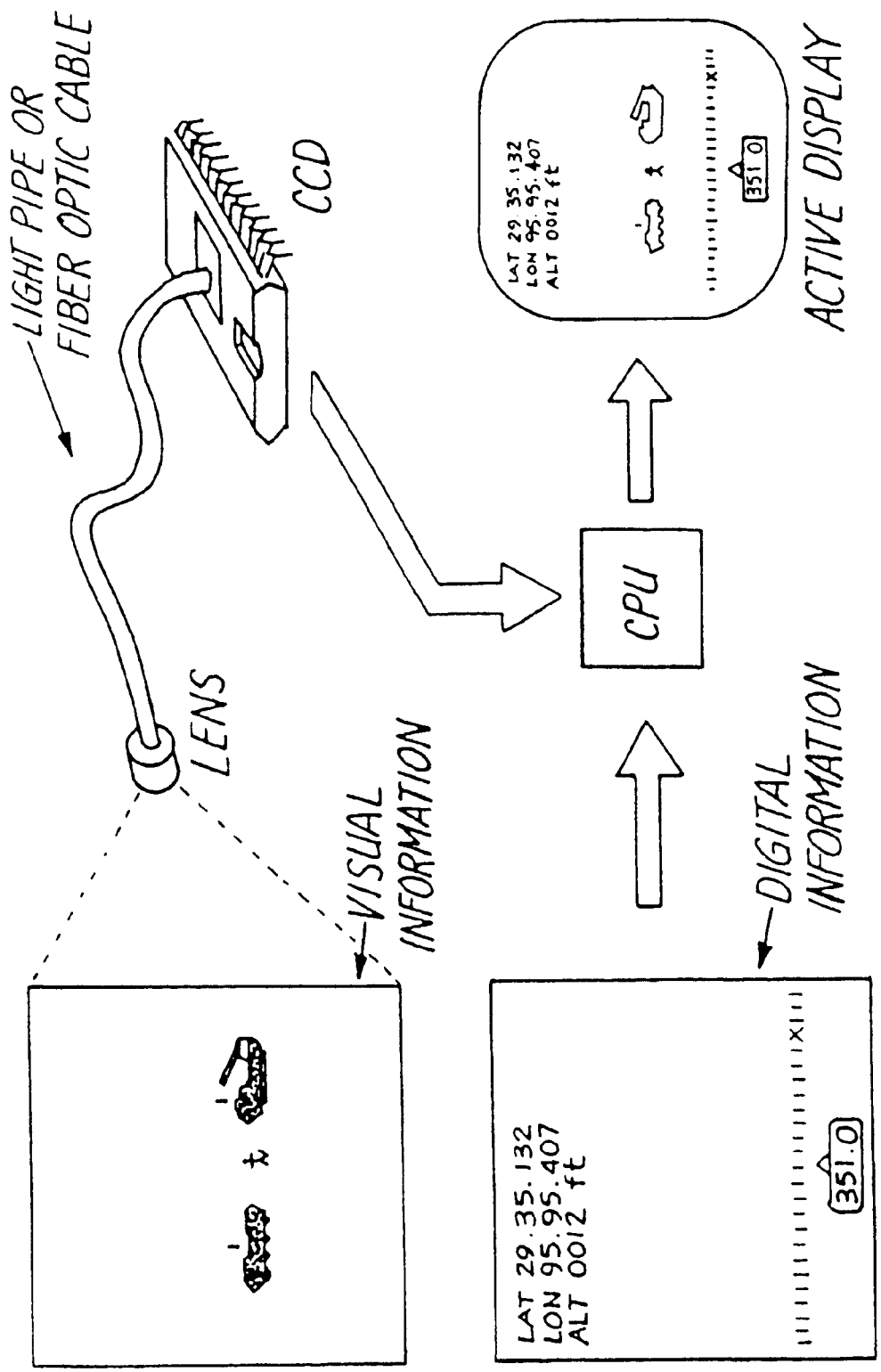

FIGS. 33–34 illustrate additional projected-image and digital display system embodiments. Detailed text, graphics and images can be displayed in a high-resolution color heads-up display format without interfering with normal vision. Such display systems ideally also are flexible enough to allow a wearer or other user to block out the scene in front of them and to concentrate on the information presented in the display. This is especially useful in visually noisy environments. Additionally, the display system should have little or no external signature that would compromise the position of the user in covert situations, according to preferred embodiments.

FIG. 33 centers on image-projection techniques. An image is formed on a miniature display device and projected through a series of light-pipes or fiber-optic bundles through a projection lens that casts an image on a clear screen in front of the eye. An LCD crystal can be used for the imaging screen such that the normal visual background can be blocked out to allow the user to concentrate on the presented image. FIG. 34 combines camera imaging with computer-generated graphics, presented on a small active display placed in front of the eye. A miniature light-pipe or fiber-optic bundle with lens attached at one end is connected to a high-frame-rate CCD imager. The image can then be digitally enhanced and/or combined with computer-generated graphics. After the image is formed inside the CPU, the image data will be displayed on the small active matrix display system. Preferred embodiments of display, according to this and other embodiments, employ and/or provide appropriate field-of-view, focus, astigmatism-correction, color information, speed and acuities such that no loss of "normal" vision occurs.

Figure 35:
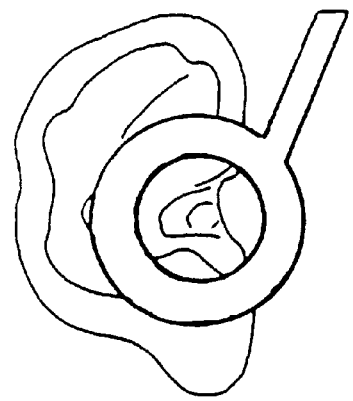
FIGS. 35–38 show audio projection system embodiments, according to the invention.
Figure 36:
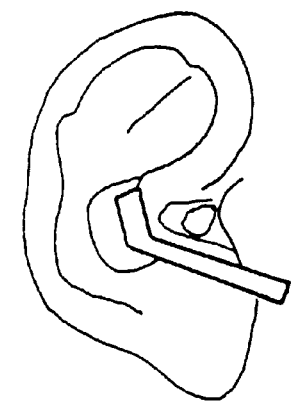
Figure 37:
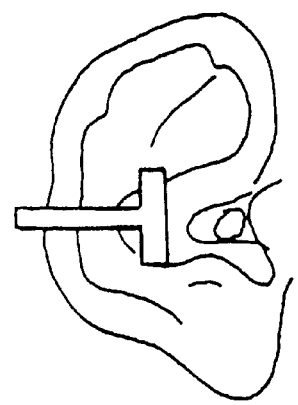

A variety of earpiece designs are contemplated, as shown in FIGS. 35–37. A high-fidelity audio input and output system is preferred, which does not interfere with the user's normal voice or hearing. Miniature condenser microphone technology can be used for voice input. Packaging and positioning of the microphone preferably is optimized to maximize voice pickup and clarity while minimizing background noise, and noise created by wind and breathing, for example. Solid-state piezoelectric transducers can be used, although other sound-producing elements are contemplated as well. FIG. 35 illustrates an annular-type embodiment, FIG. 36 a dog-leg-type embodiment and FIG. 37 a hammer-head-type embodiment of earpiece designs.

Figure 38:
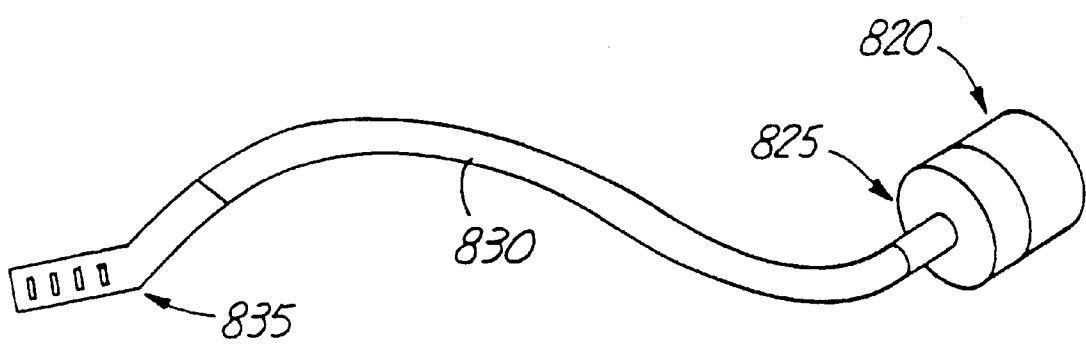

FIG. 38 is a schematic illustration of an audio-projection system according to an embodiment of the invention. Speaker element 820 is connected via coupler 825 to flexible sound-pipe 830 and associated sound-vent 835. FIG. 38 is a more generic depiction of a system useable with the embodiments of FIGS. 35–37.

Also contemplated according to embodiments of the invention are miniature I/O sensor systems. Small I/O systems reduce weight and minimize the overall impact on the user. Interchangeable I/O modules are also contemplated, to increase the performance of an individual wearer and/or a team in carrying out certain high-risk tasks, such as military operations, firefighting, etc. Four general categories of modules are contemplated, for example: multispectral imaging systems, navigational I/O systems, environmental sensor systems, and biological sensor systems.

Four high-resolution imaging modules are contemplated, according to embodiments of the invention: a mid-infrared imager, a near-infrared imager, a visible imager with fixed-zoom capability, and an ultraviolet/x-ray imager. For the mid-IR system, a mercury-cadmium-telluride imaging detector and lead-salt fiber-optic cable can be used. This system provides hyperspectral data, useful in materials-identification and extended thermal imaging applications. The mirror-IR module can include a CCD imager with fiber-optic input. This module provides primary data for thermal imaging and night-vision systems. The visible imaging module is preferably based on multispectral CCD imagers with fiber-optic input. The CPU can use the multispectral data to highlight certain spectral features to aid in target identification. The use of fiber-optic tapers allows simultaneous fixed-zoom capability with no moving parts, no additional optics and without input signal loss.

A thinned, back-illuminated CCD imager provides near-ultraviolet to extreme-UV/x-ray hyperspectral coverage. This module might be useful to defeat current camouflage techniques based on unseen fluorescence features of the pigments and materials used. Additionally, the x-ray capability of the instrument is useful in the detection of radioactive materials and other x-ray sources.

For each of the imaging systems, false-color and color-mapping techniques are contemplated to identify important scene features. For low-light applications, tracer fire and bright explosions can be mapped to red/purple colors to maintain the wearer's night vision. A small changeable measurement bar can be digitally added to an image to provide passive rangefinder and/or temperature indication capabilities. Additionally, an imaging system can be used to warn the helmet wearer that he/she is being actively illuminated by laser energy.

A number of navigational modules are contemplated: a GPS (Global Positioning System) navigational module, a magnetometer azimuth (compass) module and an accelerometer/rotation rate module. The GPS module provides a multimedia display wearer with longitude, latitude, and elevation data to quickly and accurately determine position anywhere on the earth. The GPS data allows the CPU to plot the user's position relative to maps stored in memory or accessed from a remote archive site. For navigational purposes, the user can enter a set of way points that will allow the CPU to monitor progress and sound a warning if course corrections are required. GPS data can be used to estimate velocity and calculate ETA's to way points.

A compass module is based on a triaxial fluxgate magnetometer system to provide azimuth data accurate to within a half of a degree. This data can be combined with the GPS data to provide the user with dead-reckoning navigational capability. The azimuth data can be used by a team coordinator to guide members through building/ship/industrial plant blueprints. The combined GPS-azimuth data is also very useful for forward air-controller operations.

The final module in the navigational family is a six degree-of-freedom (DOF) accelerometer/rotation rate sensor package. This module supplies detailed kinetic information on the display wearer's linear and rotational motion. This information is useful to monitor the progress of team members carrying out specific tasks and to provide more detailed data for precision navigation.

Four environmental modules are contemplated: a high-temperature probe network module, an enhanced audio pickup module, an active rangefinder, and a simple meteorology module. For use in fire-fighting operations, a system of miniature high-temperature probes can be fixed to the normal fire-protective clothing from head to toe. The best temperature probes can be selected based on range, accuracy and size considerations. The probes can be the basis for a network of up to ten such sensors used in a high-temperature measurement system. The temperature data from a number of team members is useful in accurately accessing a situation and providing better allocation of resources.

The second environmental module contemplated is a small shotgun-type microphone pickup to provide enhanced multispectral audio capability. This system is used by reconnaissance personnel to locate and identify the noise signatures of vehicles from a safe distance. This module is also used by reconnaissance patrols to eavesdrop on distant conversations. The shotgun microphone module could also be used to search for trapped victims in large piles of debris.

An active laser rangefinder is the third environmental module contemplated. This system includes a small laser diode with fiber optic or light-pipe output and a small solid-state photodetector with laser line filter. The system provides range information from 10 to >1,000 feet off of uncooperative targets. This range is an order of magnitude greater if reflective targets are used.

Another environmental module contemplated is a simple meteorology unit consisting of an air temperature probe, a barometric pressure probe, and a humidity sensor. This package is important in those instances where a complete state vector of the helmet wearer's environment is necessary. It may be desirable to measure weather factors during training exercises to accurately compare results from different locations or seasons, for example. Other modules are possible, of course.

Finally, a series of five biosensor systems for use on the display wearer and/or an external patient are contemplated: a pulse module, a respiration module, a galvanic skin response module, an electrocardiograph (EKG) module, and an electroencephalograph (EEG) module. The pulse module provides critical heart-rate information using a small ear clip or using a miniature acoustic sensor placed in contact with the skin near a blood vessel.

Two types of sensors are contemplated to measure respiration rate. The first method uses small strain gauges to measure the frequency and depth of respiration based on the periodic motion of the chest cavity. The second method employs small acoustic sensors to determine respiration information. The galvanic skin response module includes a series of contacts that can be built into the helmet system. The skin resistance between these contacts can then be measured to determine biologic and emotional parameters. A set of small metal contacts located in specific locations on the chest can be used to precisely monitor heart activity. The probes for the EKG module can be attached to a special undergarment with the contacts sewn into the material. The final biomodule is the EEG system. The system can use metal contacts built into the helmet to provide a detailed monitor of brain-wave activity.

Multimedia helmet design embodiments have inputs for external biomodules which may be useful for EMT and other medical personnel to evaluate injury victims. The CPU in the design can be used to actively monitor biosensor signals and to provide visual and/or audio warning signals when preset tolerance levels are reached.

For the small, high-gain shotgun microphone system, the microphone itself can be constructed from a series of small tubes, cut to specific lengths to enhance pickup of particular audio wavelengths. The structure is then coupled to a series of small audio pickups that pass through a bandpass filter system. The audio data, broken down into frequency ranges, is then interfaced into the helmet or other display system. For the small active laser rangefinder, a miniature laser diode and photodetector pair is selected to provide eye-safe short-range distance-measuring capabilities. Appropriate pulse and timing circuitry measures the round-trip time of flight of the laser pulse. Finally, the weather-sensing module can include a miniature temperature, pressure, and humidity sensor. Together, the contemplated modules can be used to better assess the immediate surroundings of the wearer. The biomedical-sensing features can include out-of-tolerance alarm capabilities. These modules can be used to monitor the health and safety of the display-wearer, or used on external patients.

The range of add-on modules makes the rugged, lightweight, multimedia imaging display systems according to the invention very versatile. The fusion of data from a selected number of sensor modules combined with expert system interfacing almost assures that the ability levels of both individuals and team units will be enhanced through the use of these helmet systems. This modular concept also allows this system to constantly be kept up to date when mission requirements change, or when new sensor technologies or data management systems become available in the future.

For communication with other users and/or a centralized network, wireless FM local area network (LAN) communication systems are contemplated, along with infrared LAN systems. Encryption technologies are also contemplated, according to embodiments of the invention.

As described above, embodiments of the invention have particular application to wearable computing technology. Various PC card modules, microcard modules and the like can be used, including analog-to-digital converters, digital-to-analog converters, flash memory, modems, GPS navigation, Ethernet, frame grabbers, etc. Further, many different sensor types can be used according to the invention, including an IR camera, an ECG network, etc. FM-band and IR wireless communication options are also contemplated. These options are ideal for use in a variety of environments, including the shop floor, the assembly line, or even in the field at, for example, a traffic accident site. An IR system would be ideal for inter-office data and voice traffic. Additionally, such systems according to the invention employed in buildings or ships provide a quantum leap in security and fire safety, for example.

The specification is intended to be illustrative of the many variations. and equivalents possible according to the invention. Various modifications in and changes to the above-described devices and methods will be apparent to those of ordinary skill.

What is claimed is:

1. A body-carryable display device, comprising
   an image source for producing an image;
   an image transmission device, the image transmission device comprising a coherent fiber optic conduit for receiving the image from the image source and carrying the image for ultimate display, the image transmission device being carryable on the body of a user, the coherent fiber optic conduit comprising a ball lens disposed along the fiber optic conduit, the ball lens allowing the coherent fiber optic conduit to fold;
   optics for receiving and relaying the image carried by the image transmission device; and
   a display for receiving the image from the optics and displaying the image, the displayed image being visible by at least one person.

2. A fiber-optic coupled head-mounted display device, the fiber-optic coupled head-mounted display device comprising:
   drive and interface electronics for receiving a video signal from video output circuitry of a source, the drive and interface electronics producing signals compatible with display electronics;
   a display for receiving signals from the drive and interface electronics the display comprising a two-dimensional array of picture elements, the signals from the drive and interface electronics controlling which picture elements to turn on and off and controlling the brightness or color of the individual pixels to form an image on the display;
   a display light source for making the image on the display visible to a wearer of the head-mounted display device;
   imaging optics to inject and transmit the image on the display;
   a coherent fiber optic conduit for receiving the image from the display via the imaging optics, the coherent fiber optic conduit having two ends the coherent fiber optic conduit receiving the image at one end and carrying it to and replicating it at the other end, the coherent fiber optic conduit being constructed for carrying by the head of the wearer;
   projection optics for receiving and relaying the image carried by the coherent fiber optic conduit; and
   a projection mirror for receiving the image from the projection optics and relaying the image to the eye of the wearer, wherein the display is a transmission-type display; further wherein the light source is positioned behind the display to form a backlight for the display.

3. A fiber-optic coupled head-mounted display device, the fiber-optic coupled head-mounted display device comprising:
   drive and interface electronics for receiving a video signal from video output circuitry of a source, the drive and interface electronics producing signals compatible with display electronics;
   a display for receiving signals from the drive and interface electronics the display comprising a two-dimensional array of picture elements, the signals from the drive and interface electronics controlling which picture elements to turn on and off and controlling the brightness or color of the individual pixels to form an image on the display;
   a display light source for making the image on the display visible to a wearer of the head-mounted display device;
   imaging optics to inject and transmit the image on the display;

a coherent fiber optic conduit for receiving the image from the display via the imaging optics, the coherent fiber optic conduit having two ends, the coherent fiber optic conduit receiving the image at one end and carrying it to and replicating it at the other end, the coherent fiber optic conduit being constructed for carrying by the head of the wearer;

projection optics for receiving and relaying the image carried by the coherent fiber optic conduit; and a projection mirror for receiving the image from the projection optics and relaying the image to the eye of the wearer, wherein the display is a transmission-type display; further wherein the display light source is positioned in front of or to the side of the display.

4. A fiber-optic coupled head-mounted display device, the fiber-optic coupled head-mounted display device comprising:

drive and interface electronics for receiving a video signal from video output circuitry of a source, the drive and interface electronics producing signals compatible with display electronics;

a display for receiving signals from the drive and interface electronics, the display comprising a two-dimensional array of picture elements, the signals from the drive and interface electronics controlling which picture elements to turn on and off and controlling the brightness or color of the individual pixels to form an image on the display;

a display light source for making the image on the display visible to a wearer of the head-mounted display device;

imaging optics to inject and transmit the image on the display;

a coherent fiber optic conduit for receiving the image from the display via the imaging optics, the coherent fiber optic conduit having two ends, the coherent fiber optic conduit receiving the image at one end and carrying it to and replicating it at the other end, the coherent fiber optic conduit being constructed for carrying by the head of the wearer;

projection optics for receiving and relaying the image carried by the coherent fiber optic conduit; and a projection mirror for receiving the image from the projection optics and relaying the image to the eye of the wearer, wherein the projection mirror comprises an off-axis parabolic mirror.

5. A fiber-optic coupled head-mounted display device the fiber-optic coupled head-mounted display device comprising:

drive and interface electronics for receiving a video signal from video output circuitry of a source, the drive and interface electronics producing signals compatible with display electronics;

a display for receiving signals from the drive and interface electronics, the display comprising a two-dimensional array of picture elements, the signals from the drive and interface electronics controlling which picture elements to turn on and off and controlling the brightness or color of the individual pixels to form an image on the display;

a display light source for making the image on the display visible to a wearer of the head-mounted display device;

imaging optics to inject and transmit the image on the display;

a coherent fiber optic conduit for receiving the image from the display via the imaging optics, the coherent fiber optic conduit having two ends, the coherent fiber optic conduit receiving the image at one end and carrying it to and replicating it at the other end, the coherent fiber optic conduit being constructed for carrying by the head of the wearer;

projection optics for receiving and relaying the image carried by the coherent fiber optic conduit; and a projection mirror for receiving the image from the projection optics and relaying the image to the eye of the wearer, wherein the projection mirror comprises a transparent substrate overlain with a partially reflective coating.

6. A fiber-optic coupled head-mounted display device for use by a wearer, the fiber-optic coupled head-mounted display device comprising:

drive and interface electronics for receiving a video signal from video output circuitry of a source, the drive and interface electronics producing signals compatible with display electronics;

a display for receiving signals from the drive and interface electronics and displaying an image, the signals from the drive and interface electronics controlling formation of the image on the display, the display being constructed for carrying by the head of the wearer;

a display light source for making the image on the display visible to a wearer of the head-mounted display device;

imaging optics to inject and transmit the image on the display;

a coherent fiber optic conduit for receiving the image from the display via the imaging optics, the coherent fiber optic conduit having two ends, the coherent fiber optic conduit receiving the image at one end and carrying it to and replicating it at the other end, the coherent fiber optic conduit being constructed for carrying by the head of the wearer;

projection optics for receiving and relaying the image carried by the coherent fiber optic conduit; and a projection mirror for receiving the image from the projection optics and relaying the image to the eye of the wearer.

7. The device of claim 6, wherein the display comprises a two-dimensional array of picture elements, the signals from the drive and interface electronics controlling which picture elements to turn on and off and controlling the brightness and/or color of the individual pixels to form the image on the display.

8. A body-carryable display device, comprising:

an image source for producing an image;

a display for displaying the image, the display being constructed for support by the head of the user;

structure extending from adjacent the image source toward the display, said structure being constructed for support by the head of the user, said structure comprising an image transmission device, the image transmission device comprising an optical rod constructed to receive the image from the image source and carry the image for ultimate display; and projection optics for receiving the image carried by the image transmission device and relaying the image along an image path to the display, the device being constructed such that the image path is substantially unenclosed, the projection optics being constructed for support by the head of the user.

9. The device of claim 8, wherein said structure further comprises at least a portion of the frame of eyeglasses.

10. The device of claim 8, wherein the image source is disposed behind the ear of the user.

11. The device of claim 8, wherein the display is supported by said structure.

12. A body-carryable display device, comprising
means for producing an image, the means for producing an image being carryable by the head of a user;
means for transmitting the image, comprising means for receiving the image from the image source and carrying the image for ultimate display, the means for transmitting the image being carryable on the body of the user;
means for receiving and relaying the image carried by the means for transmitting the image; and
means for receiving the image from the means for receiving and relaying, and for displaying the image to at least one person.

13. The device of claim 12, wherein the at least one person is a person other than the user.

14. A finger-carryable display device, comprising
an image source for producing an image;
an image transmission device, the image transmission device comprising at least one optically transmissive fiber for receiving the image from the image source and carrying the image for ultimate display, the image transmission device being constructed and dimensioned for substantially encircling the finger of a user and being worn as a finger ring by the user;
optics, operably coupled with the image transmission device, for receiving and relaying the image carried by the image transmission device; and
a display for receiving the image from the optics and displaying the image, the displayed image being visible by at least one person.

15. The device of claim 14, wherein the image transmission device comprises a fiber optic conduit.

16. The device of claim 15, wherein the fiber optic conduit is a first fiber optic conduit, further wherein the device further comprises a second fiber optic conduit operably coupled to a second image source for receiving a second image therefrom, the second fiber optic conduit being constructed and dimensioned for substantially encircling the finger of the user and being worn as a finger ring by the user in close association with the first fiber optic conduit.

17. The device of claim 16, wherein the first fiber optic conduit and the second fiber optic conduit are constructed to slide relative to each other.

18. The device of claim 16, further comprising a camera operably coupled to one of the first and second fiber optic conduits for transmitting an image thereto.

19. The device of claim 18, wherein the first fiber optic conduit and the second fiber optic conduit are constructed to slide relative to each other to aim the camera.

20. The device of claim 15, further comprising a microphone and speaker operably or physically coupled to the image transmission device, the microphone and speaker being constructed for audio input and output.

21. The device of claim 15 in combination with a personal computer, the device further comprising a data transmission device for transmitting data to the personal computer.

22. The device of claim 15, wherein the display is constructed and arranged for projection of the image away from the device.

23. The device of claim 22 in combination with mounting structure for supporting the device off the user's finger while the image is being projected away from the device.

24. The device of claim 23, wherein the mounting structure further comprises a light source for projecting the image away from the device.

25. The device of claim 22 in combination with a display screen for receiving the projected image from the device.

26. The device of claim 15, further comprising selectable, alternative projection optics, physically or operably connected with the image transmission device, for selection by a user.

27. The device of claim 26, wherein the selectable, alternative projection optics comprise a plurality of different lenses in a rotatable wheel.

28. A body-carryable display device, comprising
an image source for producing an image, the image source being constructed for support by the head of a user of the device;
a display for displaying the image, the display being constructed for support by the head of the user;
structure extending from adjacent the image source toward the display, said structure being constructed for support by the head of the user, said structure comprising an image transmission device, the image transmission device comprising an optical rod constructed to receive the image from the image source and carry the image for ultimate display; and
projection optics for receiving and relaying the image carried by the image transmission device, the projection optics being constructed for support by the head of the user;
the display receiving the image from the projection optics and displaying the image, the displayed image being visible to at least one eye of the user.

29. The device of claim 28, wherein said structure further comprises at least a portion of the frame of eyeglasses.

30. The device of claim 28, wherein the image source is disposed behind the ear of the user.

31. The device of claim 28, wherein the display is supported by said structure.

32. The device of claim 28, wherein the optical rod is a coherent fiber optic rod.

33. The body-carryable display device of claim 28, the body-carryable display device having a power consumption of less than about 0.5 W.

34. The body-carryable display device of claim 28, the body-carryable display device having a mass of less than about 500 grams.

35. The body-carryable display device of claim 28, the body-carryable display device having a mass of less than about 250 grams.

36. The display device of claim 28, wherein the optical rod comprises at least one fiber optic taper.

37. The display device of claim 28, wherein the optical rod is connected with a ball lens.

38. A body-carryable display method, comprising:
producing an image with an image source carried by the head of a user;

transmitting the image by an image transmission device, the image transmission device comprising a fiber optic rod including at least one optically transmissive fiber for receiving the image from the image source and carrying the image for ultimate display, the image transmission device being carryable on the body of the user;

receiving and relaying the image carried by the image transmission device by projection optics;

receiving the image from the projection optics with a display, the display being visible by at least one person; and displaying the image to the at least one person.

39. The method of claim 38, further comprising supporting the display with the image transmission device.

40. The method of claim 38, wherein the at least one person is a person other than the user.

* * * * *